United States Patent
Zhao et al.

(10) Patent No.: US 11,923,582 B2
(45) Date of Patent: Mar. 5, 2024

(54) HYDROGEN-BASED BATTERY

(71) Applicant: NEWSOUTH INNOVATIONS, PTY LIMITED, Sydney (AU)

(72) Inventors: Chuan Zhao, Sydney (AU); Haocheng Guo, Sydney (AU); Yachao Zeng, Sydney (AU); Wenhao Ren, Sydney (AU); Zhen Su, Sydney (AU); Xuancheng Peng, Sydney (AU)

(73) Assignee: NEWSOUTH INNOVATIONS, PTY LIMITED, Sydney (AU)

( * ) Notice: Subject to any disclaimer, the term of this patent is extended or adjusted under 35 U.S.C. 154(b) by 110 days.

(21) Appl. No.: 17/290,064

(22) PCT Filed: Oct. 29, 2019

(86) PCT No.: PCT/AU2019/051192
§ 371 (c)(1),
(2) Date: Apr. 29, 2021

(87) PCT Pub. No.: WO2020/087119
PCT Pub. Date: May 7, 2020

(65) Prior Publication Data
US 2021/0399327 A1    Dec. 23, 2021

(30) Foreign Application Priority Data

Oct. 29, 2018  (AU) .............................. 2018904094
Aug. 20, 2019  (AU) .............................. 2019903032

(51) Int. Cl.
  *H01M 8/18*    (2006.01)
  *H01M 4/50*    (2010.01)
  (Continued)

(52) U.S. Cl.
  CPC ............. *H01M 8/188* (2013.01); *H01M 4/50* (2013.01); *H01M 4/8626* (2013.01); *H01M 4/96* (2013.01);
  (Continued)

(58) Field of Classification Search
  CPC ...... H01M 8/188; H01M 4/50; H01M 4/8626; H01M 4/96; H01M 12/08
  See application file for complete search history.

(56) References Cited

U.S. PATENT DOCUMENTS

2005/0019657 A1* 1/2005 Shinyama ............. H01M 4/242
                                                              429/218.2
2013/0189571 A1* 7/2013 Abouimrane ........... H01M 4/60
                                                              429/188
(Continued)

FOREIGN PATENT DOCUMENTS

| | | |
|---|---|---|
| JP | H0613105 A | 1/1994 |
| JP | 2015534708 A | 12/2015 |
| WO | 2017172290 A1 | 10/2017 |

OTHER PUBLICATIONS

Yang et al., "Freestanding and flexible graphene wrapped MnO2/MoO3 nanoparticle based assymetric supercapacitors for high energy density and output voltage", RSC Advances (2015), vol. 5, pp. 45129-45135. (Year: 2015).*

(Continued)

*Primary Examiner* — Karie O'Neill Apicella
(74) *Attorney, Agent, or Firm* — Carter, DeLuca & Farrell LLP

(57) ABSTRACT

Disclosed herein are batteries and methods of making batteries. The batteries disclosed herein generally comprise a cathode, an electrolyte capable of conducting protons and/or hydronium ions, and an anode comprising a material capable of absorbing protons and/or hydronium ions, wherein (i) the cathode is in contact with a cathode substance, or (ii) the (Continued)

Bare Carbon Fiber

Glass Fiber Separator soaked with
Aqueous Electrolyte ($Mn^{2+}$ 4M, $H^+$ 0.05M)

Anode electrode comprising
PTCDA (70%), Acetylene black
(20%), Nafion (10%)

electrolyte comprises a reduced cathode substance, or (iii) the cathode is in contact with a cathode substance and the electrolyte comprises a reduced cathode substance, and wherein the cathode substance is an oxide of one or more metals or an oxide of a halide.

7 Claims, 21 Drawing Sheets

(51) Int. Cl.
    *H01M 4/86*         (2006.01)
    *H01M 4/96*         (2006.01)
    *H01M 12/08*       (2006.01)
    *H01M 4/02*         (2006.01)

(52) U.S. Cl.
    CPC ...... *H01M 12/08* (2013.01); *H01M 2004/028* (2013.01); *H01M 2004/8684* (2013.01)

(56) References Cited

U.S. PATENT DOCUMENTS

| | | | | |
|---|---|---|---|---|
| 2014/0072836 A1* | 3/2014 | Mills | ................... | H01M 4/8626 |
| | | | | 429/422 |
| 2015/0086883 A1* | 3/2015 | Tsukada | ................... | B29C 41/22 |
| | | | | 264/105 |
| 2017/0237106 A1* | 8/2017 | Wang | ................... | H01M 8/188 |
| | | | | 429/405 |

OTHER PUBLICATIONS

International Search Report dated Jan. 17, 2020, corresponding to counterpart International Application No. PCT/AU2019/051192; 6 pagers.

Written Opinion of the International Searching Authority, dated Jan. 17, 2020, corresponding to counterpart International Application No. PCT/AU2019/051192; 6 pages.

Yang et al., "Freestanding and flexible graphene wrapped $MnO_2$/$MoO_3$ nanoparticle based asymmetric supercapacitors for high energy density and output voltage", RSC Advances (2015), vol. 5, pp. 45129-45135.

Extended European Search Report issued in corresponding application EP 19877568.6 dated Oct. 24, 2022 (10 pages).

English translation of Japanese Office Action for application No. 2021-523756, dated Oct. 10, 2023, 10 pages.

Wang, Xianfu, et al., "Redox chemistry of molybdenum trioxide for ultrafast hydrogen-ion storage," Angewandte Chemie International Edition, Sep. 2018, pp. 11569-11573, 57.36.

* cited by examiner

HYDROGEN-BASED BATTERY

CROSS-REFERENCE TO RELATED APPLICATIONS

This application is a national phase entry under 35 U.S.C. 371 of PCT International Application PCT/AU2019/051192 filed Oct. 29, 2019, which claims priority to Australian Patent Application No. 2018904094, filed Oct. 29, 2018 and Australian Patent Application No. 2019903032, filed Aug. 20, 2019, the disclosure of each of these applications is expressly incorporated herein by reference in their entirety.

FIELD OF THE INVENTION

The present invention relates to batteries. In particular, the present invention relates to a battery having a particular combination of redox-active component (i.e. redox pair), a proton and/or hydronium ion-conducting electrolyte and an anode material capable of storing or absorbing hydrogen species in the form of a proton and/or a hydronium ion, and to methods of making such batteries and using such batteries.

BACKGROUND OF THE INVENTION

With its characteristics of cleanliness and convenience, electric energy has become an indispensable part of modern human life. At present, electric energy may be stored using batteries. For example, electric energy may be generated (e.g. by renewables such as wind, solar and hydroelectric power and/or non-renewables such as oil, coal and gas) then stored using batteries, especially secondary batteries (e.g. redox flow batteries, lead-acid batteries and lithium-ion batteries).

Fuel cells also exist, where $H_2$ may be used as an energy storage reservoir (i.e. fuel) and converted to electric energy when required. Among many kinds of fuel cells, the proton exchange membrane fuel cell (PEMFC) is commonly regarded as the most promising candidate and ready for commercialization. To catalyse the sluggish oxygen reduction reaction, a high mass loading of Pt is typically necessary. In addition, high purity compressed $H_2$ (which is explosive) is employed as fuel. Typical PEMFCs depend on noble metals such as Pt to catalyse the oxygen reduction reaction and there are safety concerns regarding $H_2$. These traits bring significant obstacles hindering wider application of PEMFCs.

Lead-acid batteries have been around for more than 150 years and they were the first secondary battery to be used on a large scale. Lead-acid batteries use lead with lead oxide as an electrode and typically use a sulfuric acid solution as an electrolyte. Lead-acid batteries have low energy storage costs (150~600 USD/(kW·h)), good reliability and high efficiency (70%~90%). They are one of the most mature and widely used power technologies. However, lead-acid batteries typically have a short life (e.g. 500 to 1000 cycles), low energy density (e.g. 30 to 50 (W·h)/kg), a narrow operative temperature range, slow charging speed and the possibility of easily releasing gas by overcharging. Lead-acid batteries also have environmental concerns.

Lithium-ion batteries (LIBs) have been popular for use in computers, communications devices, consumer products and even in electric vehicles. However, there are bottlenecks for the development of LIBs, such as safety concerns, rate capability and energy density. For example, LIBs typically comprise highly flammable and toxic components (mainly in the electrolytes) and electric vehicles are now approaching the charge/discharge limits for current nonaqueous LIB systems.

In recent years there has been an increase in utilization of renewable energies such as photovoltaics (solar) and wind power. However, wind and photovoltaic power generation have unstable and discontinuous characteristics that can have an impact on the local power grid. It is generally believed that large-scale energy storage can improve the efficiency of the grid and improve discrepancies between power supply and demand. Current large-scale energy storage and conversion technologies can be roughly divided into several groups, including mechanical energy storage (e.g. flywheel energy storage, pumped storage and compressed air energy storage), direct energy storage (e.g. super capacitor and superconducting magnetic energy storage), chemical energy storage (e.g. fuels such as hydrogen and other chemicals) and electrochemical energy storage (e.g. secondary battery systems, super/pseudo-capacitors). Battery supercapacitor hybrid devices (BSHDs) have also been developed, which may have advantageous properties (e.g. high energy density, short charging times and high power density).

There exist various disadvantages with current energy storage devices and there is a need for alternative energy storage devices that overcome at least some of the disadvantages identified above. There is also a need for safe, efficient and/or inexpensive large-scale energy storage technology. It would be advantageous to provide alternative battery types, especially batteries that avoid the use of and/or minimise the formation of gaseous components.

SUMMARY OF THE INVENTION

In a first aspect, the present invention provides a battery comprising:
 a cathode,
 an electrolyte capable of conducting protons and/or hydronium ions; and
 an anode comprising a material capable of absorbing protons and/or hydronium ions;
wherein
 (i) the cathode is in contact with a cathode substance; or
 (ii) the electrolyte comprises a reduced cathode substance; or
 (iii) the cathode is in contact with a cathode substance and the electrolyte comprises a reduced cathode substance,
and wherein
 the cathode substance is an oxide of one or more metals or an oxide of a halide.

In a second aspect, the present invention provides a method of making a battery, the method comprising contacting an electrolyte with an anode and a cathode, wherein:
 the electrolyte is capable of conducting protons and/or hydronium ions and comprises (a) protons and/or hydronium ions and (b) a reduced cathode substance, the reduced cathode substance having a conjugate redox pair which is a cathode substance being an oxide of one or more metals or an oxide of a halide; and
 the anode comprises a material capable of absorbing protons and/or hydronium ions.

In a third aspect, the present invention provides a battery prepared by the method of the second aspect.

In a fourth aspect the present invention provides the use of the battery of the first or third aspect for storage of energy.

In a fifth aspect, the present invention provides a method of splitting water without the evolution of gaseous hydrogen or gaseous oxygen, the method comprising:
1) contacting an electrolyte comprising a reduced cathode substance capable of oxidation to form a cathode substance with (a) an anode comprising a material capable of absorbing protons and/or hydronium ions and (b) a cathode, and
2) applying a voltage across the anode and cathode to thereby oxidise the reduced cathode substance, forming a cathode substance and $H^+$, the $H^+$ forming a hydronium ion that associates with the material capable of absorbing protons and/or hydronium ions, wherein the cathode substance is an oxide of one or more metals or an oxide of a halide.

In a sixth aspect, the present invention provides a battery comprising:
a cathode capable of absorbing and releasing protons and/or hydronium ions,
an electrolyte capable of conducting protons and/or hydronium ions; and
an anode comprising $MoO_3$, especially $MoO_3$ nanofibers, capable of absorbing protons and/or hydronium ions;

wherein, in use, protons and/or hydronium ions move between the cathode and anode.

BRIEF DESCRIPTION OF THE FIGURES

Particular embodiments of the present invention are described below, by way of example only, with reference to the accompanying drawings in which.

DETAILED DESCRIPTION OF THE INVENTION

Figure 1:
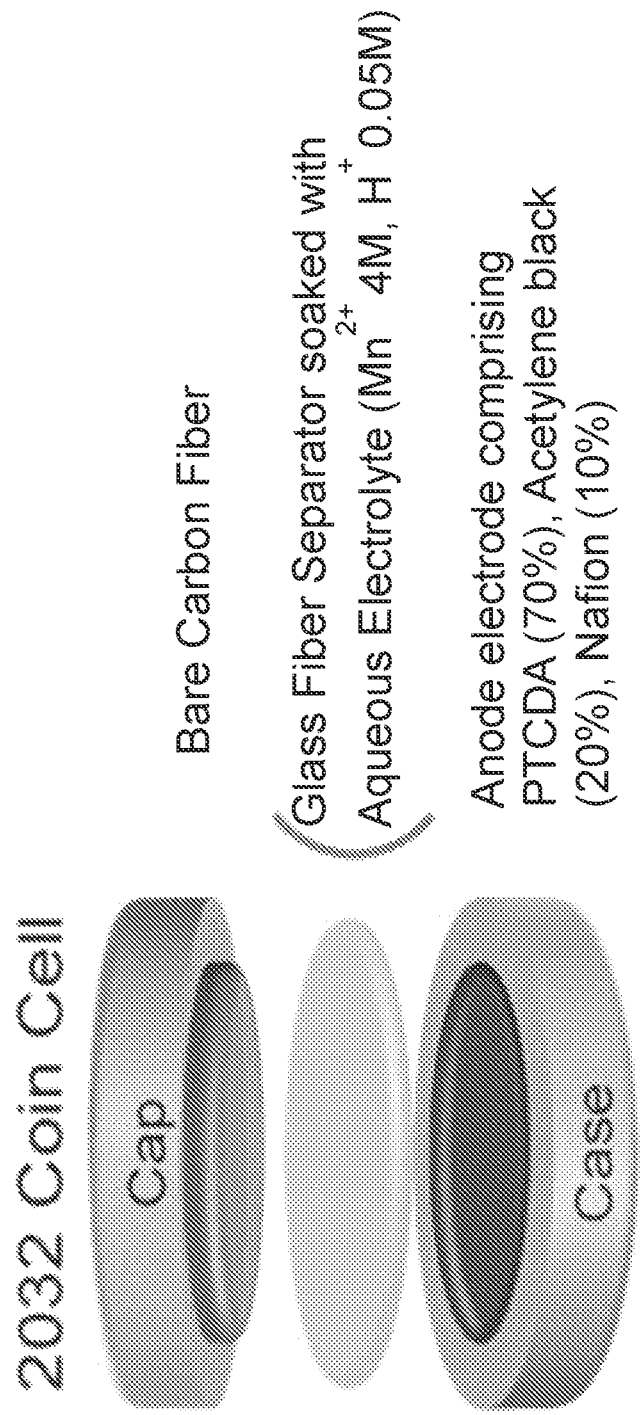
FIG. 1 shows a schematic of the battery prepared in Example 1.
Figure 2:
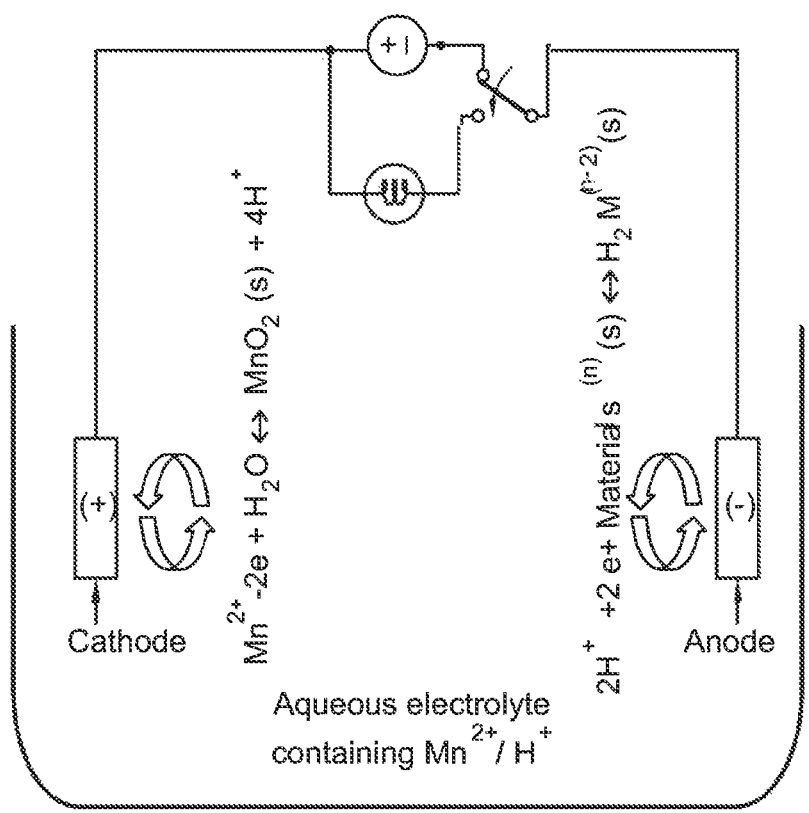
FIG. 2 shows a schematic of the working principle of the battery prepared in Example 1.

Particular embodiments of the present invention are described below, by way of example only.

Battery

In a first aspect, the present invention provides a battery comprising:
a cathode,
an electrolyte capable of conducting protons and/or hydronium ions; and
an anode comprising a material capable of absorbing protons and/or hydronium ions;
wherein
(i) the cathode is in contact with a cathode substance; or
(ii) the electrolyte comprises a reduced cathode substance; or
(iii) the cathode is in contact with a cathode substance and the electrolyte
comprises a reduced cathode substance,
and wherein
the cathode substance is an oxide of one or more metals or an oxide of a halide.

As will be appreciated by a person skilled in the art, the "cathode substance" and the "reduced cathode substance" function as a redox pair on the cathode side when the battery is in use. That is, the "reduced cathode substance" and the "cathode substance" may be described as a "conjugate redox pair". In some embodiments, the conjugate redox pair are stable and active (i.e. capable of providing capacity via electrochemical reactions).

Advantageously, the battery of the present invention typically does not involve gaseous components (e.g. no gas fuel as is common in PEMFCs) and therefore requires no complicated pressure-resistant equipment to store gaseous components. Additionally, the formation of a gaseous phase typically causes a change of about $10^4$-fold difference in specific volume (at atmospheric pressure) which might entail a large overpotential and raise safety concerns.

In some embodiments, the battery is a secondary battery. In some embodiments, when the secondary battery is being charged, the reduced cathode substance contacts (electrically, which may also be physically) the cathode and is oxidized to form the cathode substance. Conversely, when the secondary battery is being discharged, the cathode substance contacts (electrically, which may also be physically) the cathode and is reduced to form the reduced cathode substance which may then transfer into the electrolyte. In some embodiments, when the secondary battery is being charged, the reduced cathode substance is oxidized (to form the cathode substance) and deposited onto the cathode in a condensed phase. Conversely, when the secondary battery is being discharged, the cathode substance contacts (electrically, which may also be physically) the cathode and is reduced to form the reduced cathode substance which is liberated from the condensed phase into the electrolyte in the form of a mobile reduced cathode substance.

In some embodiments, the battery is a primary battery. When the battery is configured in the form of a primary battery, the battery is assembled having the cathode substance in contact with the cathode.

As used herein, the term "battery" is used broadly to include conventional-type batteries as well as "battery-supercapacitor-hybrid-devices" (BSCHDs). Batteries and supercapacitors both rely on electrochemical processes, however, the different electrochemical mechanisms underlying each of these processes afford different charge-storage properties. The distinction between batteries and supercapacitors is not always clear. A recent report has attempted to describe features of batteries and supercapacitors ("*Where Do Batteries End and Supercapacitors Begin?*" *Science Magazine* 2014 343(6176): 1210-1211). In some embodiments, the battery of the present invention may be described as a battery-supercapacitor-hybrid-device. A battery-supercapacitor-hybrid-device comprises a battery-type electrode and a supercapacitor-type or pseudo-capacitor-type electrode. Such BSCH devices can integrate the advantages of both battery and supercapacitor, with advantageous electrochemical performances (e.g. high energy density from the battery aspect and/or high charge/discharge rates from the supercapacitor aspect).

Advantageously, the battery of the present invention is not limited to any particular form factor, size, weight or capacity. For example, the battery may be configured in a smaller size (for use in, for example, handheld or portable devices) through to a larger size (for use in, for example, electric vehicles, or for grid-scale storage).

In some embodiments, the battery is dimensioned as a common consumer battery, for example, AAA, AA, C, D, PP3, 18650, coin or button cell (e.g. LR44 or CR20XX series, such as CR2032). Advantageously, such batteries may be used in existing devices without the need to modify or redesign the device to accommodate such batteries. In addition, current manufacturing processes for making batteries would not need much adaptation to be capable of producing batteries in accordance with the present invention. In some embodiments, the battery is dimensioned to have a larger capacity, for example, suitable for use in electric vehicles, residential- or office-scale storage or for grid-scale storage.

In some embodiments, the electrolyte is non-flammable. In some embodiments, the battery comprises only environmentally-friendly components (i.e. components not generally considered to pose an environmental hazard, such as heavy metals (e.g. lead in lead-acid batteries) or other toxic components (e.g. lithium hexafluorophosphate in LIBs)).

In some embodiments, the battery comprises a single electrolyte (i.e. one type of electrolyte that contacts the anode and cathode). In other embodiments, the battery comprises more than one electrolyte, for example, one type of electrolyte contacts the anode and another type of electrolyte contacts cathode. In such embodiments, the different electrolytes may be separated by a separator (e.g. a membrane) which is permeable to protons and/or hydronium ions. In such systems, the battery operates as two half cells which can be useful for high voltage redox pairs that may not be compatible with one type of electrolyte (e.g. aqueous electrolytes which would not otherwise work due to a redox potential being beyond the water oxidation potential). In some embodiments, the electrolyte is solid and also acts as a separator.

In some embodiments, the battery involves flow-battery-type half reactions at the cathode side, the anode side or both the cathode and anode side. In some embodiments, the battery involves common flow-battery-type half reactions (e.g. liquid/solution phase before and after reactions). In some embodiments, the battery involves solid flow-battery-type half reactions, which are actually conversion-reactions where either reactants or products are solid phases. A solid-state-redox flow battery is different from the liquid redox flow battery, in which the redox pair presents in the liquid phase, the product and reactant are separately stored in different tanks. While in the solid-state-redox flow battery, the redox pair coexist in the cathode chamber, the separation of the redox pair may be realized by a phase transition from solid to solid or solid to liquid.

Cathode

The battery of the present invention comprises a cathode. The cathode typically comprises a current collector portion which is not limited to being formed of any particular substance. However, the cathode current collector should be electrically conductive.

In some embodiments, the current collector has a high surface area to volume ratio (e.g. XC-72, BP2000, acetylene black) and/or a high surface area to weight ratio (e.g. active carbon black, Ketjen black).

In some embodiments the current collector is or comprises carbon cloth. In some embodiments the current collector is or comprises carbon fiber paper. In some embodiments the current collector is or comprises carbon felt. In some embodiments the current collector is or comprises a metal organic framework (MOF) and/or other nano-arrays. In some embodiments, the current collector has been modified by a process which increases the specific surface area of the current collector, such as electrodeposition or a hydrothermal process.

Redox Pair for Cathode Side (Cathode Substance and Reduced Cathode Substance)

Depending on the charge state of the battery, the battery comprises a cathode substance, a reduced cathode substance or both a cathode substance and a reduced cathode substance. The cathode substance and the reduced cathode substance function as a redox pair when the battery is in use.

The cathode substance is an oxide of a metal (i.e. metal oxide), an oxide of one or more metals (which may be present with or without other non-metal counterions) or an oxide of a halide. It follows that the reduced cathode substance is a reduced form of the oxide of the metal, a reduced form of the oxide of one or more metals, a reduced form of the oxide of the halide. In some embodiments, the cathode substance is an oxide of a metal or an oxide of a halide. In some embodiments, the cathode substance is an oxide of a metal (i.e. metal oxide). In some embodiments, the cathode substance is a binary metal oxide. In some embodiments, the binary metal oxide comprises Fe, Cu, Ni, Cr, Mn, Pb, Bi, Cr or V, especially V, Mn or Pb, more especially Mn and V. In some embodiments, the binary metal oxide comprises Mn, Pb, Bi, Cr or V, especially Mn or Pb, more especially Mn. In some embodiments, the metal oxide is a polyatomic metal oxide.

Suitable metal oxides mainly include the simple or complex oxide form of common earth-abundant metals, such as Mn, Pb, Bi, Cr, V, Mg, Ni, Co, Fe. Simple oxide forms include binary metal oxides (e.g. $MnO_2$). Complex metal oxide forms include polyatomic metal oxides (e.g. $H_aNi_b$-$Co_cMn_dO_e$, where a-e are numerical variables). The metals, or forms of the metals (e.g. salts thereof, oxides thereof or alloys), may be available in large quantities without the significant costs associated with precious metals. This may, in some embodiments, assist in providing cheaper and/or larger batteries. This may be important in the context of large-scale batteries, which may not be prohibitively expensive when one or more key components are earth-abundant. In addition, earth-abundant substances are generally considered to be environmentally friendly.

In some embodiments, the oxides also associate with precious metal elements, such as Re, Ru, Os, Rh, Ir, Pd, Pt, Ag and Au, which work as either the hosts or the substitutes of such oxides.

In some embodiments, the earth abundant metal is an environmentally friendly metal. Such embodiments may be preferred in terms of the ability to provide a battery that minimizes or avoids the use of environmentally unfriendly substances.

In some embodiments, the earth abundant metal is an earth abundant metal capable of existing in a high oxidation state, at least in some transition states (e.g. +4, +5, +6, +7 or +8 oxidation state)

In some embodiments, the cathode substance is an oxide or oxyacid salt of Mn, Pb, Bi, Cr, V, Cl, Br or I.

In some embodiments, the cathode substance is $MnO_2$ and the reduced cathode substance is $Mn^{2+}$. In some embodiments, the cathode substance is $MnO_4^-$ and the reduced cathode substance is $MnO_2$. In some embodiments, the cathode substance is $PbO_2$ and the reduced cathode substance is $Pb^{2+}$ (e.g. Pb(II)-containing substances such as $PbSO_4$). In some embodiments, the cathode substance is $Bi_2O_4$ and the reduced cathode substance is $BiO^+$. In some embodiments, the cathode substance is $Cr_2O_7^{2-}$ and the reduced cathode substance is $Cr^{3+}$. In some embodiments, the cathode substance is $VO_2^+$ and the reduced cathode substance is $VO^{2+}$. In some embodiments, the cathode substance is $ClO_4^-$ and the reduced cathode substance is $ClO_3^-$. In some embodiments, the cathode substance is $BrO_3$ and the reduced cathode substance is $Br_2$. In some embodiments, the cathode substance is $IO_3^-$ and the reduced cathode substance is $I_2$. In some embodiments, the cathode substance is a free ion (e.g. free $Cr_2O_7^{2-}$ ions). In some embodiments, the cathode substance is part of a solid complex (e.g. $MnO_2$). In some embodiments, the reduced cathode substance is a free ion (e.g. free $Pb^{2+}$ ions). In some embodiments, the reduced cathode substance is part of a solid complex (e.g. $PbSO_4$). Although combinations of redox pairs may be used, it is generally preferable to employ a single redox pair to avoid unwanted side reactions. In some embodiments there is a driving force to expel protons and/or hydronium ions from the cathode substance (for example, and without wishing to be bound by theory, a driving force to expel protons and/or hydronium ions provided by the redox reaction of a metal oxide and water).

Theoretically, any redox pairs whose electrode potentials are higher than the anode counterpart (which is near 0 V, vs. SHE) may be used for the battery of the present invention. In particular embodiments, the cathode redox pair provides high electrode potential (e.g. higher than 0.9 V, vs. SHE) to provide a more widely useful voltage-output. Accordingly, the redox potential of the redox pair of the battery of the present invention is typically between about 0.9 V and about 2.5 V. In some embodiments, the redox pair is from about 1 V to about 2 V, for example, from about 1.1 V to about 1.9 V. Table 1 below shows the redox potentials of the redox pairs described in the above paragraph.

TABLE 1

| Redox pair | Redox potential (Vs SHE) |
|---|---|
| $MnO_2/Mn^{2+}$ | E = 1.23 V |
| $MnO_4^-/MnO_2$ | E = 1.70 V |
| $PbO_2/Pb^{2+}$ | E = 1.468 V |
| $Bi_2O_4/BiO^+$ | E = 1.59 V |
| $Cr_2O_7^{2-}/Cr^{3+}$ | E = 1.36 V |
| $VO_2^+/VO^{2+}$ | E = 1.004 V |
| $ClO_4^-/ClO_3^-$ | E = 1.201 V |
| $BrO_3^-/Be_2$ | E = 1.478 V |
| $IO_3^-/I_2$ | E = 1.195 V |

Electrolyte Capable of Conducting Protons and/or Hydronium Ions

The battery of the present invention comprises an electrolyte capable of conducting protons and/or hydronium ions ($H_3O^+$). The electrolyte may be in the form of a fluid or a solid. In some embodiments the electrolyte may be in the form of a solution, a suspension or a gel. In some embodiments, the electrolyte is a solution, especially an aqueous solution. In some embodiments, the electrolyte is a polymer electrolyte. In some embodiments, the electrolyte is a "water-in-salt" electrolyte system. In some embodiments, the electrolyte comprises greater than 1% w/w $H_2O$, for example, greater than 2% w/w $H_2O$, greater than 5% w/w $H_2O$, greater than 10% w/w $H_2O$, greater than 20% w/w $H_2O$, greater than 30% w/w $H_2O$, greater than 40% w/w $H_2O$, greater than 50% w/w $H_2O$, greater than 60% w/w $H_2O$, greater than 70% w/w $H_2O$, greater than 80% w/w $H_2O$, greater than 90% w/w $H_2O$, greater than 95% w/w $H_2O$, greater than 98% w/w $H_2O$, greater than 99% w/w $H_2O$, greater than 99.5% w/w $H_2O$ or greater than 99.9% w/w $H_2O$. In some embodiments, protons and/or hydronium ions are present in the electrolyte up to an amount of about 4 M (e.g. from about 0.001 M to about 4 M, from about 0.002 M to about 3 M, from about 0.005 M to about 2 M, from about 0.01 M to about 1 M, from about 0.02 M to about 0.5 M, from about 0.02 M to about 0.1 M, from about 0.02 M to about 0.5 M, from about 0.02 M to about 0.1 M, from about 0.05 M to about 0.1 M or about 0.05 M).

The hydronium ions may be present in the electrolyte as a result of the presence of an acid in an aqueous electrolyte (i.e. an electrolyte comprising an amount of acid and an amount of water). Examples of acids that may be included in the electrolyte include mineral acids, such as $H_2SO_4$ and $HNO_3$, and organic acids, such as $CH_3SO_3H$ and $CF_3SO_3H$. In some embodiments, the acid, when present, is present in the electrolyte up to an amount of about 8 M (e.g. from about 0.001 M to about 4 M, from about 0.002 M to about 3 M, from about 0.005 M to about 2 M, from about 0.01 M to about 1 M, from about 0.02 M to about 0.5 M, from about 0.02 M to about 0.1 M, from about 0.02 M to about 0.5 M, from about 0.02 M to about 0.1 M, from about 0.05 M to about 0.1 M or about 0.05 M). In some embodiments, the hydronium ions may be present as a result of a redox process. In some embodiments, the hydronium ions may be present as a result of the dissociation of water into $H^+$ and $OH^-$ and subsequent hydrolysis of the $H^+$ to form $H_3O^+$. Medium or strong acids may be preferred, preferably in higher concentrations.

In the discharged or partially charged state, the electrolyte comprises reduced cathode substance. The amount of reduced cathode substance in the electrolyte varies on the charge state of the battery. In some embodiments, the electrolyte comprises the reduced cathode substance at a concentration in the range of from essentially absent (completely charged state) to essentially saturated (in a discharged state). As will be appreciated by those skilled in the art, the concentration limit of the discharged state (or pristine state) may be limited by the solubility of the reduced cathode substance. The electrolyte may, in various embodiments, comprise the reduced cathode substance in a concentration in the range of from about 0.001 M to about 8 M, 0.001 M to about 7 M, from about 0.001 M to about 6 M, from about 0.001 M to about 5 M, from about 0.001 M to about 4 M, from about 0.001 M to about 3 M, from about 0.001 M to about 2 M, from about 0.001 M to about 1 M. In some embodiments, the battery is assembled with the electrolyte initially comprising the reduced cathode substance at a concentration in the range of from about 1 M to about 8 M (e.g. from about 2 M to about 6 M, from about 3 M to about 5 M, from about 3.5 M to about 4.5 M or about 4 M).

In some embodiments, the reduced cathode substance is present in the electrolyte as a result of the addition of the reduced cathode substance to the electrolyte. In some embodiments, the reduced cathode substance is present in the electrolyte as a result of a redox reaction involving the cathode substance (i.e. a redox reaction involving the conjugate redox pair).

In some embodiments, the reduced cathode substance is a $Mn^{2+}$ salt, such as, for example, from the dissolution of $MnSO_4$ or from the reduction of $MnO_2$. In some embodiments, the reduced cathode substance is $MnO_2$, such as, for example, from the reduction of $MnO_4^-$ or other intermediate substances. In some embodiments, the reduced cathode substance is a $Pb^{2+}$ salt, such as, for example, from $PbCl_2$ or from the reduction of $PbO_2$. In some embodiments, the reduced cathode substance is a $BiO^+$ salt, such as, for example, from the reduction of $Bi_2O_4$. In some embodiments, the reduced cathode substance is a $Cr^{3+}$ salt, such as, for example, from the reduction of $Cr_2O_7^{2-}$. In some embodiments, the reduced cathode substance is a $VO^{2+}$ salt, such as, for example, from the reduction of $VO_2$. In some embodiments, the reduced cathode substance is a $ClO_3^-$ salt, such as, for example, from the reduction of $ClO_4^-$. In some embodiments, the reduced cathode substance is $Br_2$, such as, for example, from the reduction of $BrO_3^-$. In some embodiments, the reduced cathode substance is $I_2$, such as, for example, from the reduction of $IO_3^-$.

The electrolyte may also comprise additional components, e.g. additives to enhance performance and/or inhibit side reactions. In some embodiments, the electrolyte comprises an ionomer such as a Nafion ionomer. It is believed that the Nafion ionomer forms a Solid-electrolyte-interphase (SEI), especially in the form of a film on an electrode surface, particularly at the anode. In some embodiments, the additive, when present, is present in the electrolyte up to an amount of about 50 wt % based on the weight of the electrolyte (e.g. from about 0.01 wt % to about 40 wt %, from about 0.1 wt % to about 30 wt %, from about 1 wt % to about 20 wt %, from about 2 wt % to about 10 wt %).

Anode Comprising a Material Capable of Absorbing Protons and/or Hydronium Ions

The battery comprises an anode comprising a material capable of absorbing protons and/or hydronium ions. The anode comprising a material capable of absorbing protons and/or hydronium ions is typically an electrically conductive substrate in physical contact with a material capable of absorbing protons and/or hydronium ions. For the avoidance of doubt, absorbing protons and/or hydronium ions includes intercalating protons and/or hydronium ions.

The electrically conductive substrate is not limited to being formed of any particular material. The electrically conductive substrate is preferably electrochemically inert. In some embodiments, the electrically conductive substrate is or comprises one or more of carbon cloth, carbon fiber paper, carbon felt, titanium foil and titanium mesh, especially carbon fiber paper. Accordingly, in some embodiments the anode comprises one or more of carbon cloth, carbon fiber paper, carbon felt (i.e. activated carbon materials), titanium foil, titanium mesh in contact with the material capable of absorbing protons and/or hydronium ions. In some embodiments, the electrically conductive substrate has a high surface area to volume ratio (e.g. XC-72, BP2000, acetylene black) and/or a high surface area to weight ratio (e.g. active carbon black, Ketjen black).

Materials capable of absorbing protons and/or hydronium ions are known. Examples include hydronium intercalation materials. Examples of hydronium intercalation materials (also referred to as hydronium storage materials) include: transition metal oxides with vacancies available for $H^+/H_3O^+$ to form a stable metal bronze or whose acidic forms are stable solids, such as $WO_3$, $VO_2$, $MoO_3$, $Nb_2O_5$, $RuO_2$, $IrO_2$, $Bi_2O_4$, and their doped analogs; polyanion compounds with vacancies available for $H^+/H_3O^+$ to form stable solids or can convert to high-valence compounds, such as $VOPO_4$ and $MoWO_4PO_4$; (pseudo-)capacitive materials effective in acidic environment, like activated carbon with sufficient porous structures. In some embodiments the material capable of absorbing protons and/or hydronium ions is a metal oxide which can form a metal bronze ($H_xMO_y$) (or with certain lattice-water). In some embodiments the material capable of absorbing protons and/or hydronium ions is a polyanion compound which can form a stable solid (e.g. $H_xMoWPO_4$) (or with certain lattice-water). In some embodiments the material capable of absorbing protons and/or hydronium ions is the metal organic framework Zn-PTCDA, comprising Zn as the metal core and PTCDA as the organic ligand, which can provide sufficient interstitial site to store ions. In some embodiments, the material capable of absorbing protons and/or hydronium ions is a MOF, nano-array, and/or one or more other nano-architectures which can increase the specific area. In some particular embodiments, the material capable of absorbing protons and/or hydronium ions is in the form of nanofibers. In some embodiments, the material capable of absorbing protons and/or hydronium ions is a polycyclic aromatic solid with one or more stable carbonyl groups, such as, for example, quinones, like anthraquinone (AQ), pyrene-4,5,9,10-tetraone (PTO), and carbonyl-containing perylenes and naphthalenes (e.g. N,N-dioctyl-3,4,9,10-perylenedicarboximide (PTCDI), perylenetetracarboxylic dianhydride (PTCDA) and 1,4,5,8-naphthalenetetracarboxylic dianhydride (NTCDA), naphthalenetetracarboxylic diimide (NTCDI), terephthalic acid (PTA), and derivatives thereof). In some embodiments, the material capable of absorbing protons and/or hydronium ions is selected from N,N-dioctyl-3,4,9,10-perylenedicarboximide (PTCDI), perylenetetracarboxylic dianhydride (PTCDA), 1,4,5,8-naphthalenetetracarboxylic dianhydride (NTCDA), naphthalenetetracarboxylic diimide (NTCDI), terephthalic acid (PTA) and a combination thereof. In some embodiments, the material capable of absorbing protons and/or hydronium ions is perylenetetracarboxylic dianhydride (PTCDA).

In some particular embodiments, the material capable of absorbing protons and/or hydronium ions is or comprises $MoO_3$. In some embodiments, the $MoO_3$ is orthorhombic.

In some particular embodiments, the material capable of absorbing protons and/or hydronium ions is or comprises $MoO_3$ nanofibers. Although not particularly limited by length, in some embodiments, the nanofibers have a length of from about 1 μm to about 200 μm, for example, from about 1 μm to about 100 μm, from about 2 μm to about 50 μm, from about 2 μm to about 20 μm, from about 2 μm to about 10 μm, from about 3 μm to about 8 μm, from about 4 μm to about 6 μm or about 5 μm. Although not particularly limited by width, in some embodiments, the nanofibers have a width of from about 5 nm to about 1 μm, for example, from about 10 nm to about 500 nm, from about 50 nm to about 400 nm, from about 100 nm to about 300 nm, from about 150 nm to about 250 nm or about 200 nm.

In some embodiments, the $MoO_3$ (e.g. $MoO_3$ nanofibers) form a layer which coats an electrically conductive substrate. This layer may, in various embodiments, and depending on the application, have a thickness of from about 0.01 mm to about 10 mm, for example, from about 0.05 to about 5 mm, from about 0.1 to about 2 mm or from about 0.14 to about 1.52 mm. Advantageously, and as shown in Example 2, protons were able to penetrate through the thicker layers of $MoO_3$ nanofibers without significant impediment, as has been observed in some prior art electrode materials.

In some embodiments, the $MoO_3$ (e.g. $MoO_3$ nanofibers) exhibit a high specific capacity. For example, in some embodiments, the $MoO_3$ (e.g. $MoO_3$ nanofibers) exhibit a specific capacity of from about 100 to about 250 mAh g$^{-1}$ at 5 C (e.g. from about 200 to about 250 mAh g$^{-1}$). In some embodiments, the $MoO_3$ (e.g. $MoO_3$ nanofibers) exhibit a high rate capability. For example, in some embodiments, the $MoO_3$ (e.g. $MoO_3$ nanofibers) exhibit a charge and/or discharge rate of from about 5 C to about 300 C (e.g. from about 10 C to about 250 C, from about 50 C to about 250 C, from about 100 C to about 250 C, from about 150 C to about 250 C, from about 200 C to about 250 C or about 235 C). Advantageously, in some embodiments, the cells display high cyclability even at higher discharge rates.

In some embodiments, the areal loading of the $MoO_3$ (e.g. $MoO_3$ nanofibers) is from about 0.01 to about 150 mg cm$^{-2}$, for example, from about 1 to about 100 mg cm$^{-2}$, from about 5 to about 100 mg cm$^{-2}$, from about 10 to about 100 mg cm$^{-2}$, from about 50 to about 100 mg cm$^{-2}$, from about 80 to about 100 mg cm$^{-2}$, from about 90 to about 95 mg cm$^{-2}$. Advantageously, and as shown in Example 2, higher areal loadings were able to be prepared and exhibited higher areal capacity (e.g. the 90.48 mg cm$^{-2}$ electrode in Example 2 displayed a high areal capacity of 14.9 mAh cm$^{-2}$ at a high current density of 18 mA cm$^{-2}$). In some embodiments, the areal capacity is from about 1 to about 40 mAh cm$^{-2}$, for example, from about 2 to about 30 mAh cm$^{-2}$, from about 3 to about 25 mAh cm$^{-2}$, from about 10 to about 25 mAh cm$^{-2}$, from about 15 to about 25 mAh cm$^{-2}$ or from about 20 to about 25 mAh cm$^{-2}$. As will be appreciated, high areal capacity is advantageous for higher charge and discharge currents of the cell.

In some embodiments, the material capable of absorbing protons and/or hydronium ions displays high cyclability, especially when the material is or comprises MoO$_3$ (e.g. MoO$_3$ nanofibers). For example, in some embodiments, the material is capable of undergoing in excess of 100 charge/discharge cycles (e.g. >1000, >2000, >5000 cycles) without exhibiting significant deterioration of capacity. For example, in some embodiments, the material is capable of undergoing from about 100 to about 10,000 charge/discharge cycles whilst maintaining greater than 80% (e.g. >90%, >95%, >98%, >99%, >99.5% or >99.9%) of its initial capacity. In some embodiments, the initial capacity is taken as the capacity after about 1-5 (e.g. 3-5) cycles, after the electrode material has stabilised. As will be appreciated, in some embodiments, the capacity drops off over the first few cycles, but tends to settle in to a more consistent capacity after the first few cycles.

In some embodiments there is a driving force for the materials capable of absorbing protons and/or hydronium ions to accept or absorb protons and/or hydronium ions from the electrolyte comprising protons and/or hydronium ions.

The material capable of absorbing protons and/or hydronium ions may, in some embodiments, contain other components. For example, in some embodiments, the hydronium storage anode materials may contain a binder (for example, Nafion, e.g. in an amount of up to 10, 20 or 30 wt %), a conducting agent (e.g. acetylene black, Super-P, XC-72), and/or solvent (for example, 2-propanol from the manufacturing process, e.g. in trace amounts).

Other Components

The battery of the present invention may, in some embodiments, include further components.

In some embodiments, the battery comprises a separator. For example, when the battery is a compact battery or when the battery comprises more than one type of electrolyte (e.g. a dual electrolyte system), a separator may need to be employed. The separator should be permeable to protons and/or hydronium ions. In some embodiments, the battery comprises a separator selected from Nafion polymer membrane, glass fiber membrane, organic porous membrane, inorganic porous membrane, filter paper and a celgard membrane.

In some embodiments, the battery comprises a "substrate-free" anode, where the anode fluids are directly processed onto one side of a separator, or the anodes are processed into a free-standing electrode, for example, using PTFE-solution as binder.

In some embodiments, the anode and/or cathode comprise electrically conductive carbon-based materials (like acetylene black, XC-72, Super P.) as conducting additives.

Charge State

As will be appreciated by a person skilled in the art, the battery of the present invention may exist in a charged state, partially charged state or discharged state. When the battery is in a charged state, a significant proportion of the redox pair will exist in the form of the cathode material (which will typically be in contact with the cathode), and only a small proportion will exist in the form of the reduced cathode substance (which will be dissolved or dispersed in the electrolyte). When the battery is in a discharged state, a significant proportion of the redox pair will exist in the form of the reduced cathode substance (which will be dissolved or dispersed in the electrolyte), and only a small proportion will exist in the form of the cathode substance (which will typically be in contact with the cathode). When the battery is in a partially charged state, the proportions of the redox pair will be somewhere between these extremes. Accordingly, in the battery of the present invention, either:

(i) the cathode is in contact with a cathode substance; or
(ii) the electrolyte comprises a reduced cathode substance; or
(iii) the cathode is in contact with a cathode substance and the electrolyte comprises a reduced cathode substance.

The term "in contact with" in this context refers to the cathode being in electrical contact with the cathode substance (i.e. electrical charge is able to flow from one to the other). This is typically achieved by the cathode being in physical contact with the cathode substance, for at least a period of time. The cathode substance is preferably a solid (i.e. in a condensed phase). When the cathode substance is a solid, it can remain in physical (and electrical) contact with the cathode. The physical contact may, in some embodiments, result from the cathode substance being in the form of a film on the cathode. The physical contact may, in some embodiments, result from the cathode substance being in the form of a coating on the cathode. The physical contact may, in some embodiments, result from the cathode substance being deposited on the cathode. In some embodiments, the cathode substance is physically dispersed in the electrolyte. In such embodiments this may form a concentration-gradient during the electrochemical process, which causes concentration polarization.

Method of Making a Battery

In a second aspect, the present invention provides a method of making a battery, the method comprising contacting an electrolyte with an anode and a cathode, wherein:
the electrolyte is capable of conducting protons and/or hydronium ions and comprises (a) protons and/or hydronium ions and (b) a reduced cathode substance, the reduced cathode substance having a conjugate redox pair which is a cathode substance being an oxide of one or more metals or an oxide of a halide; and
the anode comprises a material capable of absorbing protons and/or hydronium ions.

The present invention also provides a method of making a battery, the method comprising contacting an electrolyte with an anode and a cathode, wherein:
the electrolyte is capable of conducting protons and/or hydronium ions and comprises protons and/or hydronium ions;
the cathode is in contact with a cathode substance, the cathode substance being an oxide of one or more metals or an oxide of a halide; and
the anode comprises a material capable of absorbing protons and/or hydronium ions.

These methods comprise contacting an electrolyte with an anode and a cathode. This may be achieved by any means, so long as the electrolyte contacts both the anode and the cathode. For example, the anode and cathode may be positioned adjacent one another, and the electrolyte added as a fluid such that it touches both the anode and the cathode. In another arrangement, the electrolyte may be soaked into a material (e.g. a separator, such as a glass fiber material) and sandwiched between the anode and the cathode to thereby contact both the anode and the cathode. In some embodiments, the electrolyte that contacts the anode is the same electrolyte that contacts the cathode (i.e. there is only one electrolyte). In other embodiments, one electrolyte contacts the anode and another electrolyte contacts cathode, the two electrolytes being separated by a separator which is permeable to protons and/or hydronium ions.

The electrolyte may comprise hydronium ions. The hydronium ions may result from the dissociation of $H_2O$ (e.g. from an aqueous electrolyte) into $H^+$ and $OH^-$. The hydronium ions may also result from the dissociation of an acid species in the presence of water (e.g. from an acid in an aqueous electrolyte). In some embodiments, the hydronium ions result from a redox reaction of the redox pair. In some embodiments, the hydronium ions are derived from the addition of an acid to the electrolyte. In some embodiments, the acid is a mineral acid, such as $H_2SO_4$ and $HNO_3$, and/or an organic acid, such as $CH_3SO_3H$ and $CF_3SO_3H$. In some embodiments the concentration of acid in the electrolyte is from about 0.005 M to about 1 M, for example, from about 0.01 M to about 0.5 M, from about 0.01 M to about 0.1 M or about 0.05 M. The electrolyte may comprise protons. The protons may result from the dissociation of $H_2O$ (e.g. from an aqueous electrolyte) into $H^+$ and $OH^-$. The protons may also result from the dissociation of a protic acid (e.g. from an acid in an aqueous electrolyte). In some embodiments, the protons result from a redox reaction of the redox pair. In some embodiments, the protons are derived from the dissociation of a protic acid.

In some embodiments, when the battery is made the aqueous electrolyte comprises a reduced cathode substance. In some embodiments, the reduced cathode substance is present in the electrolyte at an initial concentration of from about 0.1 M to about 10 M, for example, from about 0.5 M to about 9 M, from about 1 M to about 8 M, from about 2 M to about 6 M, from about 3 M to about 5 M or about 4 M.

In some embodiments, the aqueous electrolyte initially comprises from about 3 M to about 5 M (e.g. about 4 M) $MnSO_4$. In some embodiments, the aqueous electrolyte initially comprises from about 0.01 M to about 0.1 M (e.g. about 0.05 M) $H_2SO_4$.

In some embodiments the method of making a battery further comprises a step of forming a cathode substance from the reduced cathode substance. This may be achieved by applying a voltage across the anode and cathode to promote a redox reaction which, at the cathode, oxidises the reduced cathode substance (present in the electrolyte) and forms the cathode substance. In some embodiments, forming the cathode substance comprises depositing the cathode substance on the cathode, typically on a cathode current collector. In other embodiments, the cathode substance is formed and dispersed into the electrolyte.

In some embodiments the method further comprises a step of associating/absorbing protons and/or hydronium ions with the material capable of absorbing protons and/or hydronium ions. This may be achieved by applying a voltage across the anode and cathode to promote a redox reaction which, at the cathode, oxidises the reduced cathode substance (present in the electrolyte) and forms protons and/or hydronium ions which are conducted (transported) to the anode wherein they associate with the material capable of absorbing protons and/or hydronium ions. The association of the protons and/or hydronium ions with the material capable of absorbing protons and/or hydronium ions may be described as intercalation or absorption. In the case of hydronium ions, this may also be termed hydroniation. This absorption/association may also be described as reversible capture and/or storage of protons and/or hydronium ions.

In some embodiments the anode comprising a material capable of absorbing protons and/or hydronium ions is or comprises an electrically conductive substrate in contact with a material capable of absorbing protons and/or hydronium ions. The material may be brought into contact with the substrate by any means which results in the material being in contact with the substrate. In some embodiments, a fluid containing the material is airbrushed onto the substrate.

In some embodiments, the fluid containing the material comprises a material capable of absorbing protons and/or hydronium ions, a binder and a solvent. In some embodiments, the binder is a polymer electrolyte. Polymer electrolytes may present H and/or $H_3O^+$ storage sites to improve the capacity. Polymer electrolytes are typically considered to be electronically insulated and ionically conductive, so they can serve as artificial solid-electrolyte-interphase to prevent side-reactions of water reduction. In some embodiments, the binder is a polymer electrolyte selected from the group consisting of polytetrafluoroethylene (PTFE), polyvinylidene difluoride (PVDF), polytetrafluoroethylene (PVDF), carboxymethyl Cellulose (CMC), nafion and sulfonated poly(ether ether ketone) (SPEEK), especially nafion. In some embodiments, the binder is selected from carboxymethyl-cellulose and xanthan gum. In some embodiments, the binder is part of the electrolyte in the assembled battery. In some embodiments, the solvent is a $C_{1-3}$ alcohol, especially 2-propanol.

In some embodiments, the fluid containing the intercalation material further comprises a conducting additive. In some embodiments, the additive is acetylene black or XC-72R, especially acetylene black which poses a large specific area.

In some embodiments, the fluid containing a material capable of absorbing protons and/or hydronium ions is in the form of a slurry.

In some embodiments, the material capable of absorbing protons and/or hydronium ions is brought into contact with the substrate by a process involving one or more of: airbrushing, an electrospraying method, a roll-to-roll coating method, a slot-die coating method, an ultrasonicating brush method and a method involving doctor-blading. Such methods allow a homogenous coating of the material onto the substrate. In some embodiments the substrate is heated (e.g. from about 50° C. to about 150° C., from about 80° C. to about 120° C., from about 90° C. to about 110° C. or about 100° C.) during or after the application of the slurry onto the substrate to at least partially remove one or more components of the slurry (e.g. the solvent).

The mass loading of the active material (i.e. the material capable of absorbing protons and/or hydronium ions) can be adjusted within a wide range, for example, from about 0.01 mg cm$^{-2}$ to about 100 mg cm$^{-2}$, from about 0.1 mg cm$^{-2}$ to about 10 mg cm$^{-2}$, from about 0.1 mg cm$^{-2}$ to about 5 mg cm$^{-2}$, from about 0.5 mg cm$^{-2}$ to about 5 mg cm$^{-2}$, from about 0.5 mg cm$^{-2}$ to about 1 mg cm$^{-2}$, from about 0.5 mg cm$^{-2}$ to about 0.9 mg cm$^{-2}$ or about 0.7 mg cm$^{-2}$. An appropriate amount will be able to be determined by a person skilled in the art having regard to the effectiveness/efficiency of the particular material.

In a third aspect, the present invention provides a battery prepared by the method of the second aspect.

Use of Battery

The battery of the first or third aspect is not limited to any particular form factor, size, weight or capacity. Accordingly, the battery may be manufactured in a number of form factors, sizes, weights or capacities that may be used in many different applications. For example, the battery may be dimensioned as a common consumer battery, for example, AAA, AA, C, D, PP3, 18650, coin or button cell. Alternatively, the battery may be dimensioned to provide a larger capacity, such as would be useful in an electrical vehicle or grid-scale storage setting.

Accordingly, in a fourth aspect the present invention provides the use of the battery of the first or third aspect for storage of energy. In some embodiments, the storage of energy is the storage of renewable energy. In some embodiments, the storage of energy is the grid-scale storage of energy. In some embodiments, the storage of energy is the grid-scale storage of renewable energy. In some embodiments, the storage of energy is the storage of energy for mobile devices. In some embodiments, the storage of energy is the storage of energy for vehicles.

Advantageously, in at least some embodiments of the present invention, the transfer of protons and/or hydronium ions in the electrolyte is fast or even ultrafast, providing fast charging and/or fast discharging (i.e. high C values). This feature may be useful in providing a quick response when used in grid-scale storage of renewable energy. This feature may also be useful in electric vehicles or appliances (e.g. drones, tools, vehicles such as cars) which require high current capacities (e.g. supplying enough current for more powerful electric motors and/or faster charging).

In a fifth aspect, the present invention provides a method of splitting water without the evolution of gaseous hydrogen or gaseous oxygen, the method comprising:
1) contacting an electrolyte comprising a reduced cathode substance capable of oxidation to form a cathode substance with (a) an anode comprising a material capable of absorbing protons and/or hydronium ions and (b) a cathode, and
2) applying a voltage across the anode and cathode to thereby oxidise the reduced cathode substance, forming a cathode substance and $H^+$, the $H^+$ forming a hydronium ion that associates with the material capable of absorbing protons and/or hydronium ions, wherein the cathode substance is an oxide of one or more metals or an oxide of a halide.

Advantageously, the method of the fifth aspect may avoid the use of expensive catalysts such as Pt or $IrO_2$ typically used to split water in PEMFCs. In some embodiments, the oxidation to form a cathode substance comprises storing the oxygen from water in the cathode substance (e.g. by incorporation of oxygen from water into an oxygen-containing cathode substance).

In an embodiment, the method of splitting water is reversed to provide water and an electric current. In such embodiments, the method comprises:
1) contacting an electrolyte with (a) an anode comprising protons and/or hydronium ions associated with a material capable of absorbing protons and/or hydronium ions and (b) a cathode in contact with a cathode substance which is an oxide of one or more metals or an oxide of a halide and
2) connecting an external electric circuit to the anode and cathode to allow charge to flow between the anode and cathode (i.e. electrical current) and to thereby (a) release the protons and/or hydronium ions from the material capable of absorbing protons and/or hydronium ions into the electrolyte and (b) reduce the cathode substance to form a reduced cathode substance and $H_2O$ which are released into the electrolyte.

In a sixth aspect, the present invention provides a battery comprising:
a cathode capable of absorbing and releasing protons and/or hydronium ions (e.g. by chemical or physical means),
an electrolyte capable of conducting protons and/or hydronium ions, especially an aqueous electrolyte; and
an anode comprising $MoO_3$, especially $MoO_3$ nanofibers, capable of absorbing protons and/or hydronium ions;
wherein, in use, protons and/or hydronium ions move between the cathode and anode. In some embodiments, the protons and/or hydronium ions move between the cathode and anode in a process analogous to "Newton's cradle" (i.e. where one proton and/or hydronium ion enters the electrolyte and a different proton and/or hydronium ion exits the electrolyte).

In some particular embodiments, the cathode absorbs and releases protons and/or hydronium ions via an electrochemical or redox reaction.

EXAMPLES

Example 1

A battery was prepared in the form factor of a CR2032-type coin cell and the electrochemical performance was assessed.

Perylenetetracarboxylic dianhydride (PTCDA) (70 wt %), acetylene black (20 wt %) and nafion ionomer (10 wt %) were combined with 2-propanol (as the solvent, the mass ratio of the solvent-to-solid is 25:1). The mixture was mixed in a flask and ultrasonicated by a tip sonifier to form a homogeneous electrode slurry. The slurry was then air-brushed onto carbon fiber paper (an electrochemically-nonactive substrate with high conductivity) using an air-pumped spray gun. During the spraying process, the substrate was fixed onto a steel-plate which was heated at 100° C. by a hot-stage to evaporate the solvent. Using this method, the mass loading of active material (in this case PTCDA) can be adjusted within a wide range. In this example, it was set as 0.7 mg $cm^{-2}$. Afterwards, both anode was punched out into a disc for further fabrication. Similarly, a cathode was punched out of carbon fiber paper.

An aqueous solution comprising saturated $MnSO_4$ (about 4 M), and $H_2SO_4$ (0.05 M) was used as an electrolyte, and a glass fiber membrane was used as a separator.

Figure 3A:
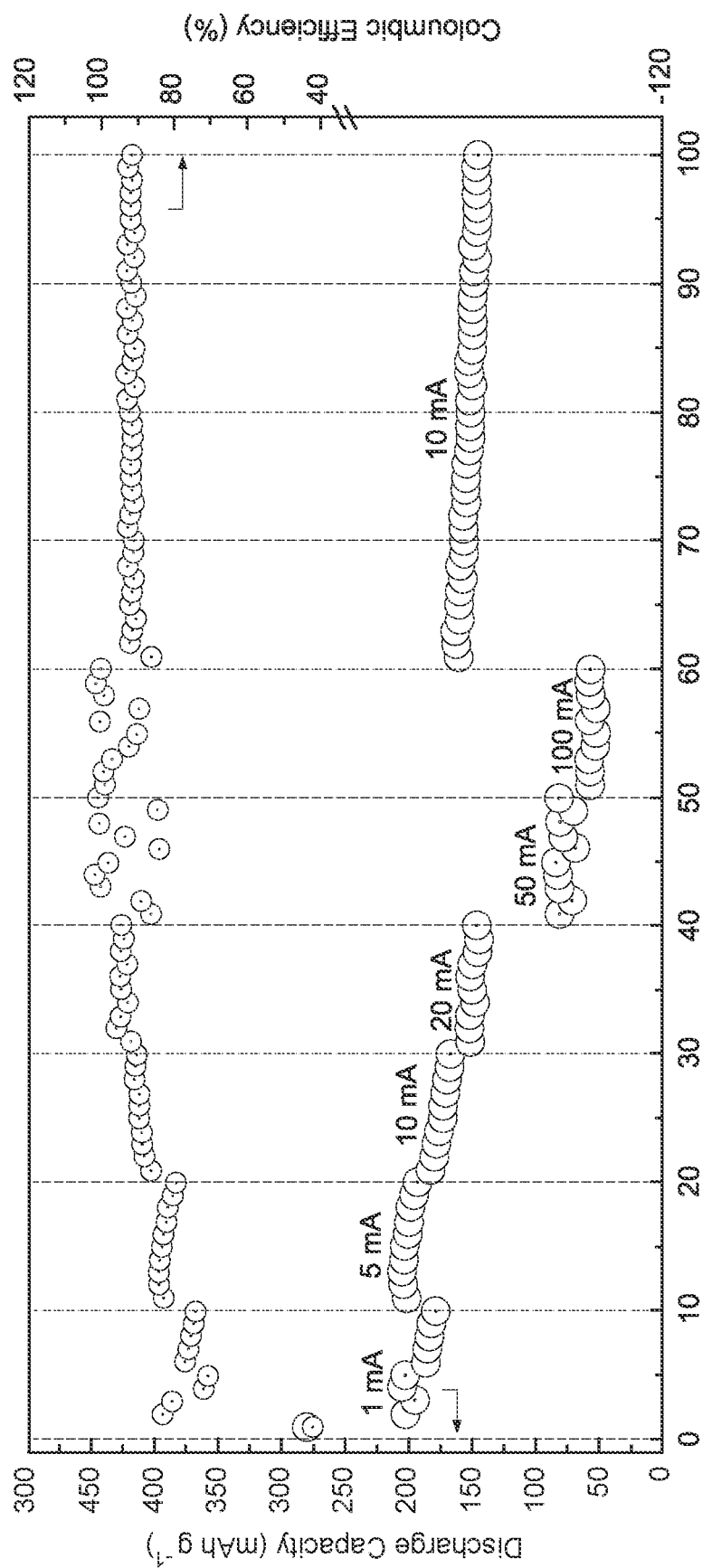
FIG. 3a shows a graph of the discharge capacity (lower/left y-axis) and coloumbic efficiency (upper/right y-axis) vs. cycle number (x-axis) for the battery prepared in Example 1 at different capacities.
Figure 3B:
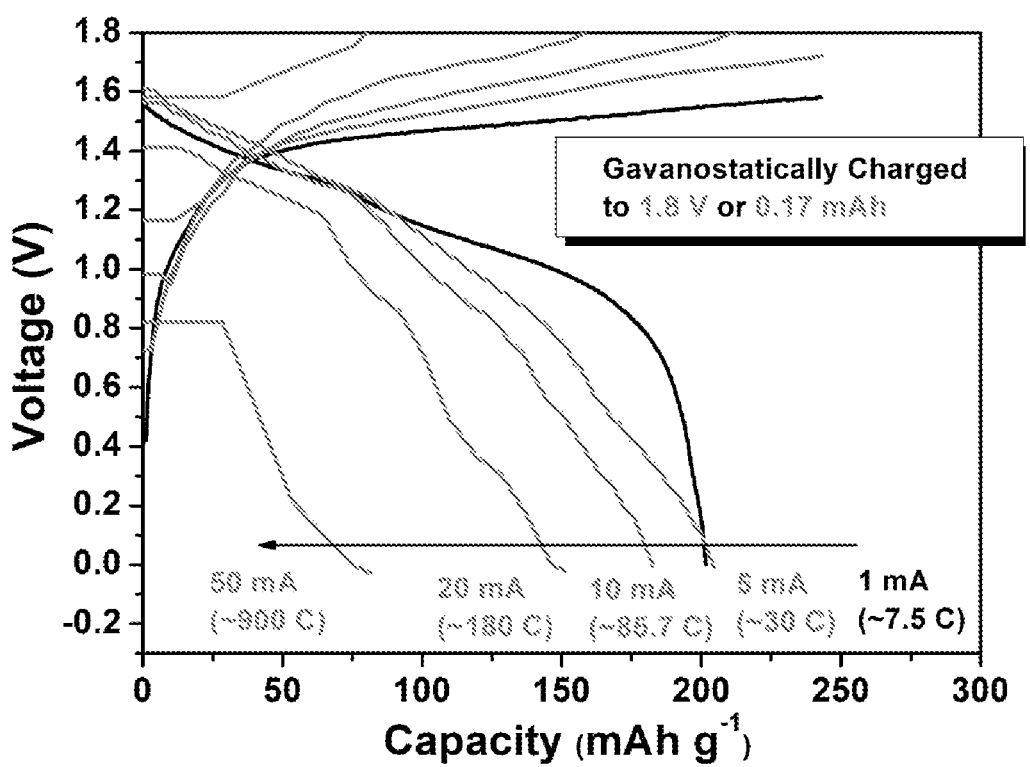
FIG. 3b shows a graph of voltage (V, y-axis) vs capacity per gram (mAh $g^{-1}$, x-axis) at different current density for discharge (~7.5 C, ~30 C, ~87.5 C, ~180 C and ~900 C) of the battery prepared in Example 1 (C-rate is calculated based on the discharge time, i.e. 1 C means the discharge process could finish in 1 h). In each case the battery was first galvanostatically charged to 1.8 V or 0.17 mAh.
Figure 3C:
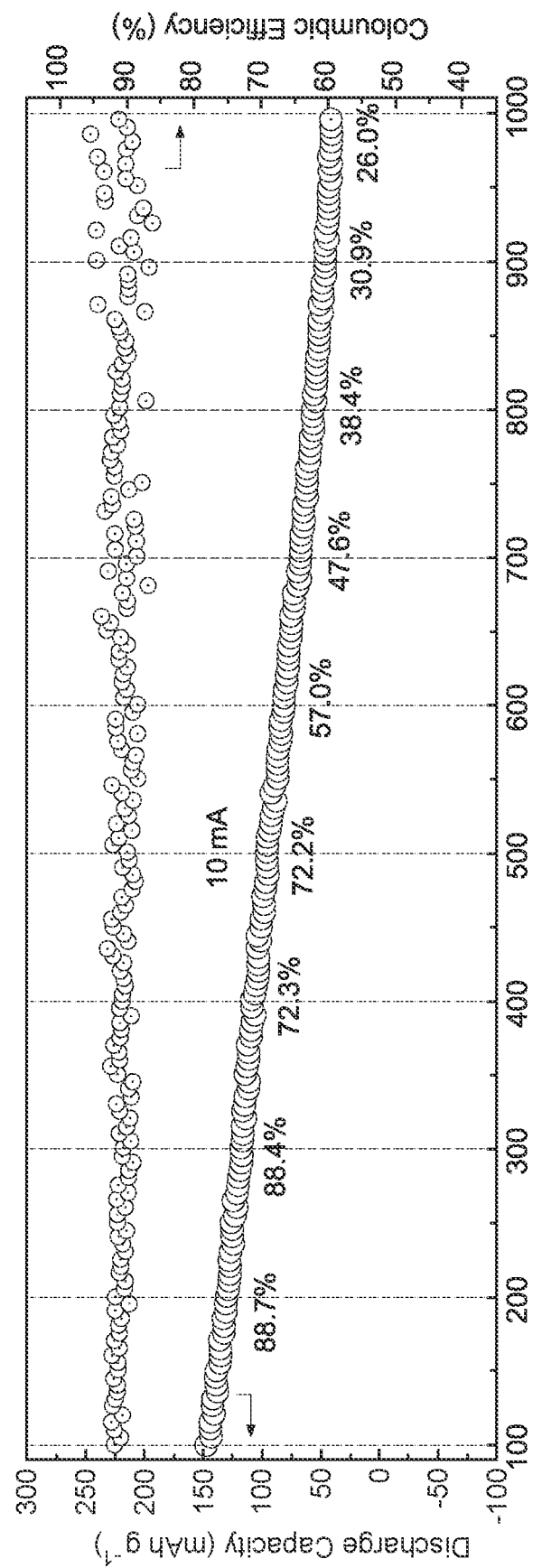
FIG. 3c shows a graph of the long-term cycling performance (the discharge capacity (lower/left y-axis) and coloumbic efficiency (upper/right y-axis) vs. cycle number (x-axis)) for the battery prepared in Example 1 at a discharge rate of 10 mA (~85.7 C) for 1000 cycles.
Figure 4:
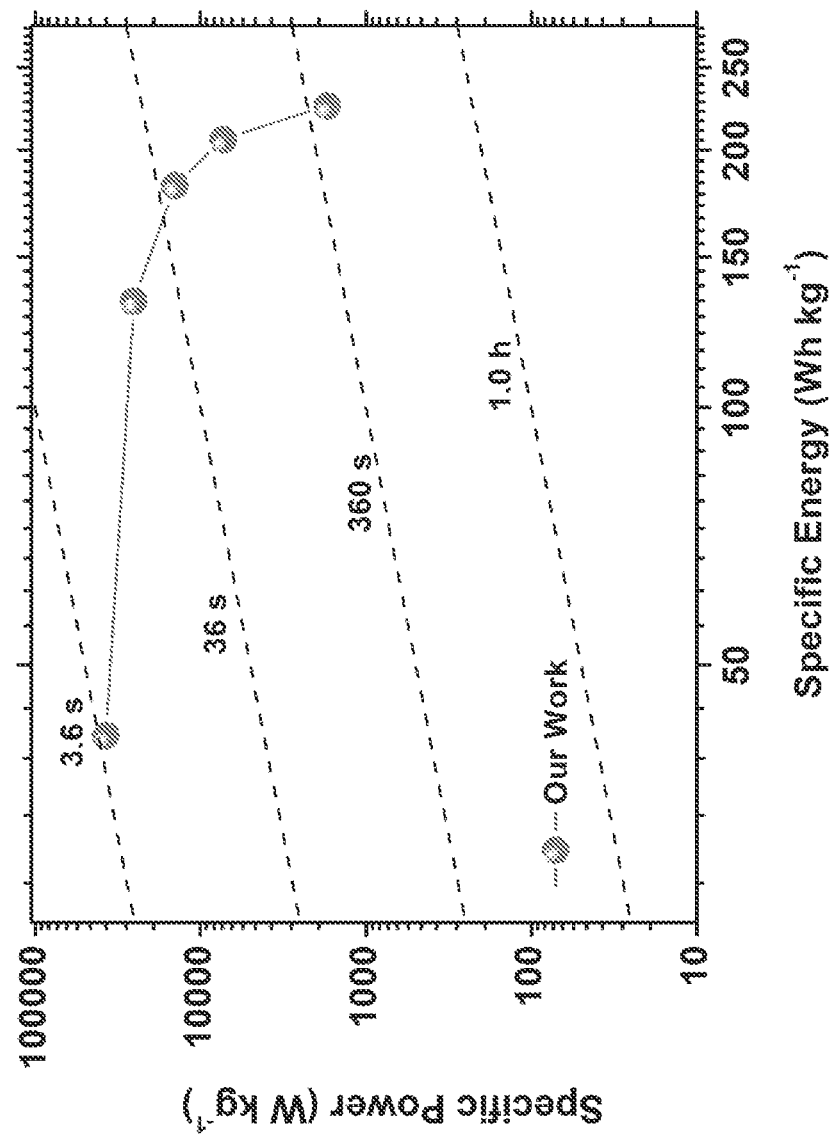
FIG. 4 shows the Ragone plot (a graph of specific power (W $kg^{-1}$, y-axis) vs. specific energy (Wh $kg^{-1}$, x-axis)) for the battery prepared in Example 1, demonstrating the excellent rate and energy storage capability of the battery prepared in Example 1.

The coin-cell was assembled by a crimping machine with applied pressure about 50 kg/$cm^2$ (sandwiching the electrolyte, ~0.2 mL, and glass fiber membrane between the electrode and cathode as shown in FIG. 1) at ambient temperature. Galvanostatic charge & discharge tests were under different constant current densities via a Land battery test system. Results are shown in FIGS. 3a, 3b, 3c and 4. This battery demonstrated good electrochemical properties (decent capacity, cycling performances, and remarkable rate-capabilities) as compared to current state-of-art batteries. Notably, the Ragone plot demonstrates that this device can be a good combination for merits of both battery (high energy density) and supercapacitor (high rate-capability), believed to be due to the ultrafast transportation property of protons/hydronium ions. The graphs in FIGS. 3a-3c are based on the battery having an electrode area of ~1.007 $cm^2$ and ~0.7 mg active material (i.e. PTCDA).

Example 2

Anodes comprising MoO$_3$ nanofibers were investigated.

Synthesis of MoO$_3$ Nanofibers

MoO$_3$ nanofibers were synthesized by an established hydrothermal method [Sun, Z. et al. *Electrochim. Acta* 239, 16-24 (2017)]. In a typical experiment, (NH$_4$)$_6$Mo$_7$O$_{24}$·4H$_2$O (1 g) was dissolved in 30 mL water by stirring. 5 mL nitric acid (70%) was added dropwise into the solution and stirred for 40 min. The mixture was subsequently transferred to a 50 mL Teflon-lined autoclave, and then the reaction was heated at 180° C. for 24 h. The as-prepared MoO$_3$ nanofibers were filtered, washed with deionized water and ethanol several times, and dried in an oven at 70° C. overnight.

Characterization

The crystallographic structure of the as-obtained sample was assessed by X-ray diffraction (XRD, PANalytical, Cu Kα radiation, 45 kV, 40 mA). The morphology and microstructure were analyzed by scanning electron microscopy (SEM, QUANTA 450) and transmission electron microscopy (TEM, JEOL F200). The surface components analysis was performed by X-ray photoelectron spectrum (XPS, Thermo ESCALAB250i.). Raman spectra were obtained on a Renishaw INVIA microscope using 514 nm excitation.

Electrochemical Measurements

To prepare the working electrodes, 70 wt % MoO$_3$ nanofibers, 20 wt % carbon black, and 10 wt % PVDF were dispersed in N-methyl pyrrolidone and then grinded for 30 min to form a homogeneous slurry. The slurry was spread on carbon fiber paper with a size of 1 cm×2 cm followed by overnight drying at 70° C. To prepare high-areal loading electrodes (>10 mg cm$^{-2}$), the slurry was coated on both sides of the carbon fiber paper. The electrochemical performance was tested in a three-electrode cell including a MoO$_3$ working electrode, a large piece of graphite counter electrode, and a saturated calomel electrode (SCE) reference electrode. The electrolytes were 6 M H$_2$SO$_4$ or 0.5 M Li$_2$SO$_4$ aqueous solution. Cyclic voltammetry (CV) and electrochemical impedance spectroscopy (EIS) were performed by an electrochemical workstation (Autolab PGSTAT302N). Galvanostatic charge/discharge (GCD) was recorded on a multichannel battery testing system (LAND CT2001A).

Discussion

Figure 5:
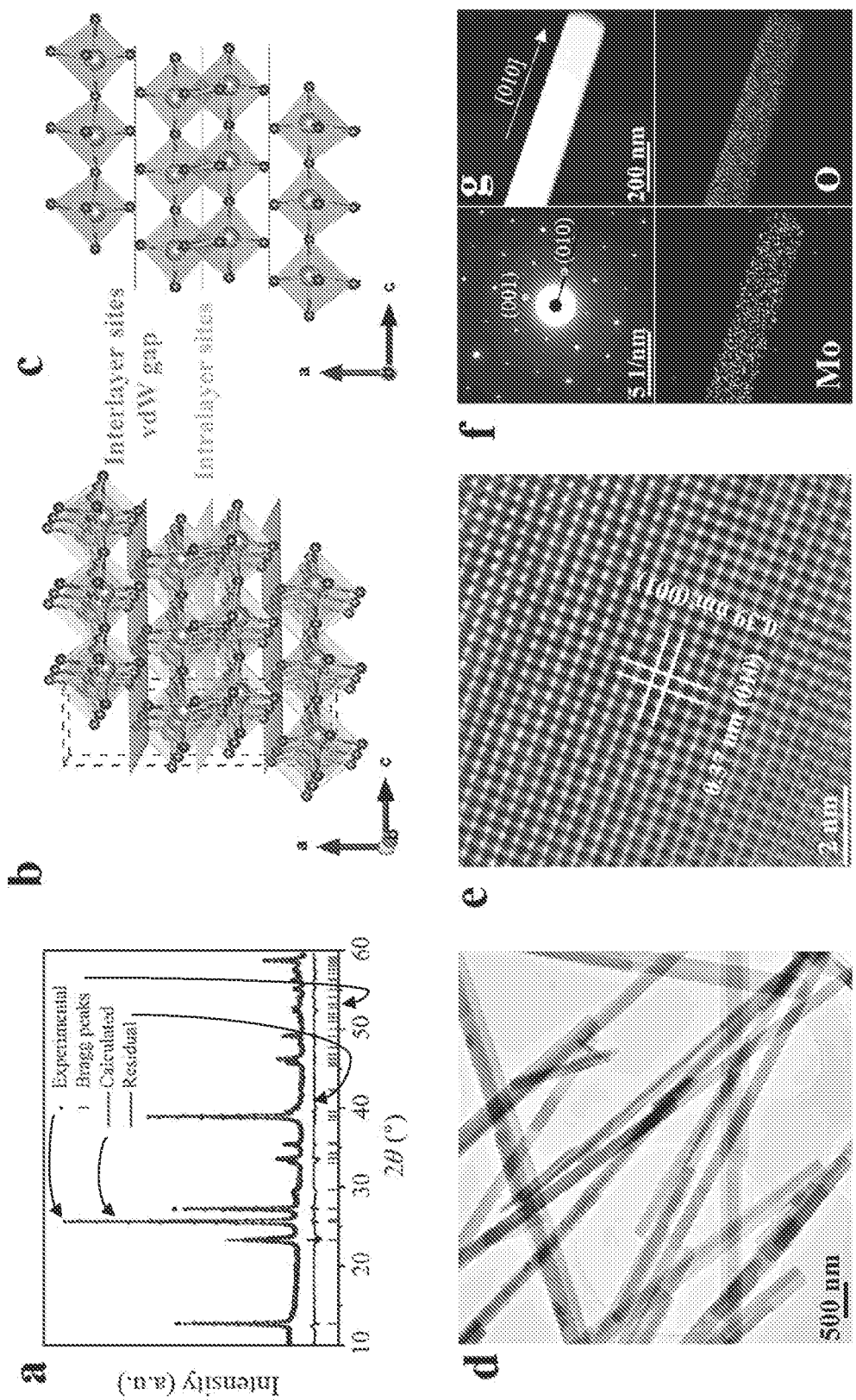
FIG. 5 summarizes results and physical characterization data of $MoO_3$ nanofibers described in Example 2, wherein: (a) shows an XRD pattern (intensity (a.u.) vs 2 theta) and the Rietveld refinement; (b, c) show a refined crystal structure of $MoO_3$, where the larger purple and smaller red spheres represent Mo and O atoms, respectively; (d) is a low-magnification TEM image of the $MoO_3$ nanofibers; (e) is an HRTEM image; (f) is an SAED pattern; and (g) shows images of element mapping recorded on the same nanofiber, showing the distribution of Mo (bottom left) and O (bottom right).
Figure 6:
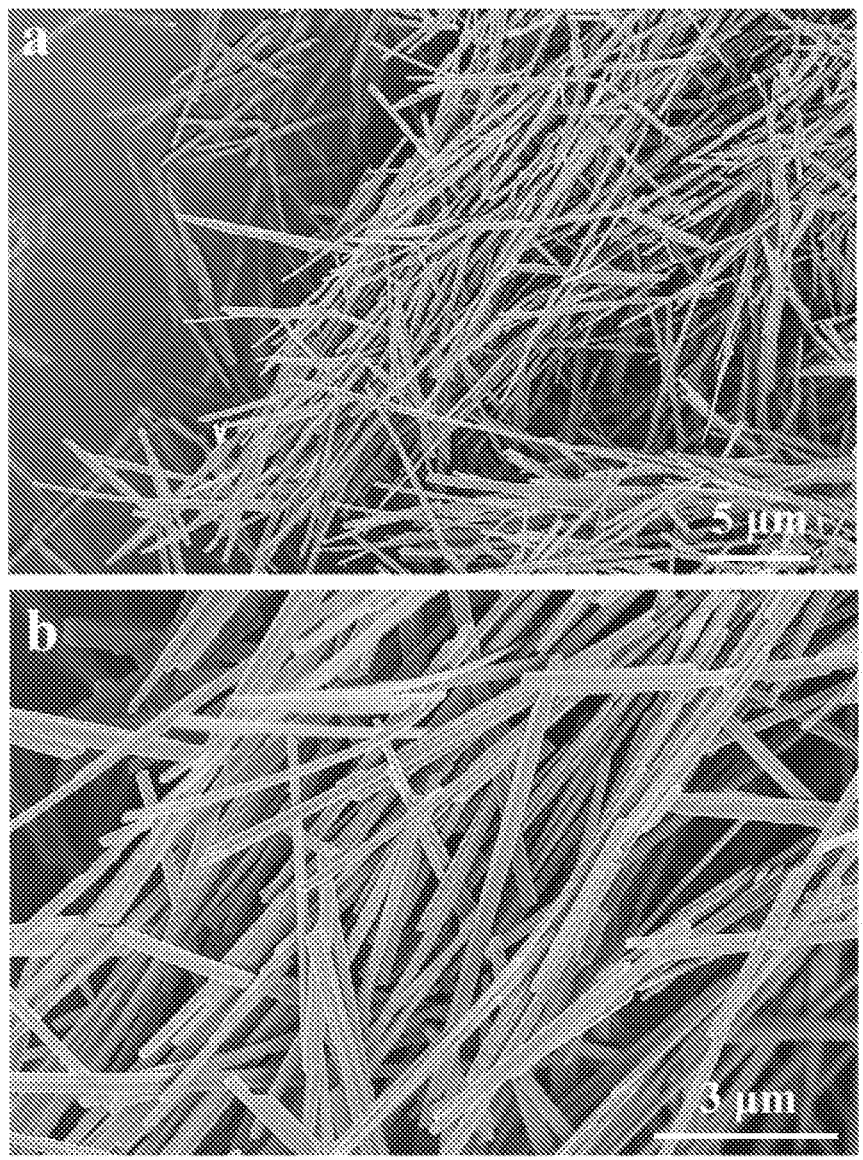
FIG. 6 (a, b) are SEM images of the $MoO_3$ nanofibers prepared in Example 2 (scale bar=5 μm in (a), 3 μm in (b)).

The XRD pattern in FIG. 5a indicates that the as-synthesized sample is orthorhombic MoO$_3$, which is corroborated by XPS results (not shown). The space group of MoO$_3$ is Pnma with lattice parameters of a=13.87300 Å, b=3.70630 Å, and c=3.96560 Å. The refined crystal structure is presented in FIG. 5b. In MoO$_3$, double layers of MoO$_6$ octahedra is repeatedly arranged in bc planes and stacked along a axis by van der Waals interactions. MoO$_3$ is, thus, of a layered structure, and hosts two possible intercalation sites for hydrogen ions, the interlayer sites (the green panel) and intralayer sites (the orange panel). Low-magnification TEM (FIG. 5d) and SEM (FIG. 6) show a homogeneous nanofiber morphology, ~200 nm wide and ~5 m long. To analyze the microstructure of MoO$_3$ nanofibers, high-resolution TEM (HRTEM), selected area electron diffraction (SAED) and element mapping were recorded on the same nanofiber. The lattice fringe spacings of 0.37 nm and 0.39 nm correspond to (010) and (001) planes of orthorhombic MoO$_3$, respectively (FIG. 5d). The single-crystal SAED pattern is attributed to the diffraction of [100] zone axis (FIG. 5e). HRTEM and SAED further reveal that the well-crystallized MoO$_3$ nanofiber grows along the [010] direction, as marked in FIG. 5g. Furthermore, the homogeneous distribution of Mo and O in the nanofiber is evidenced by the element mapping.

Figure 7:
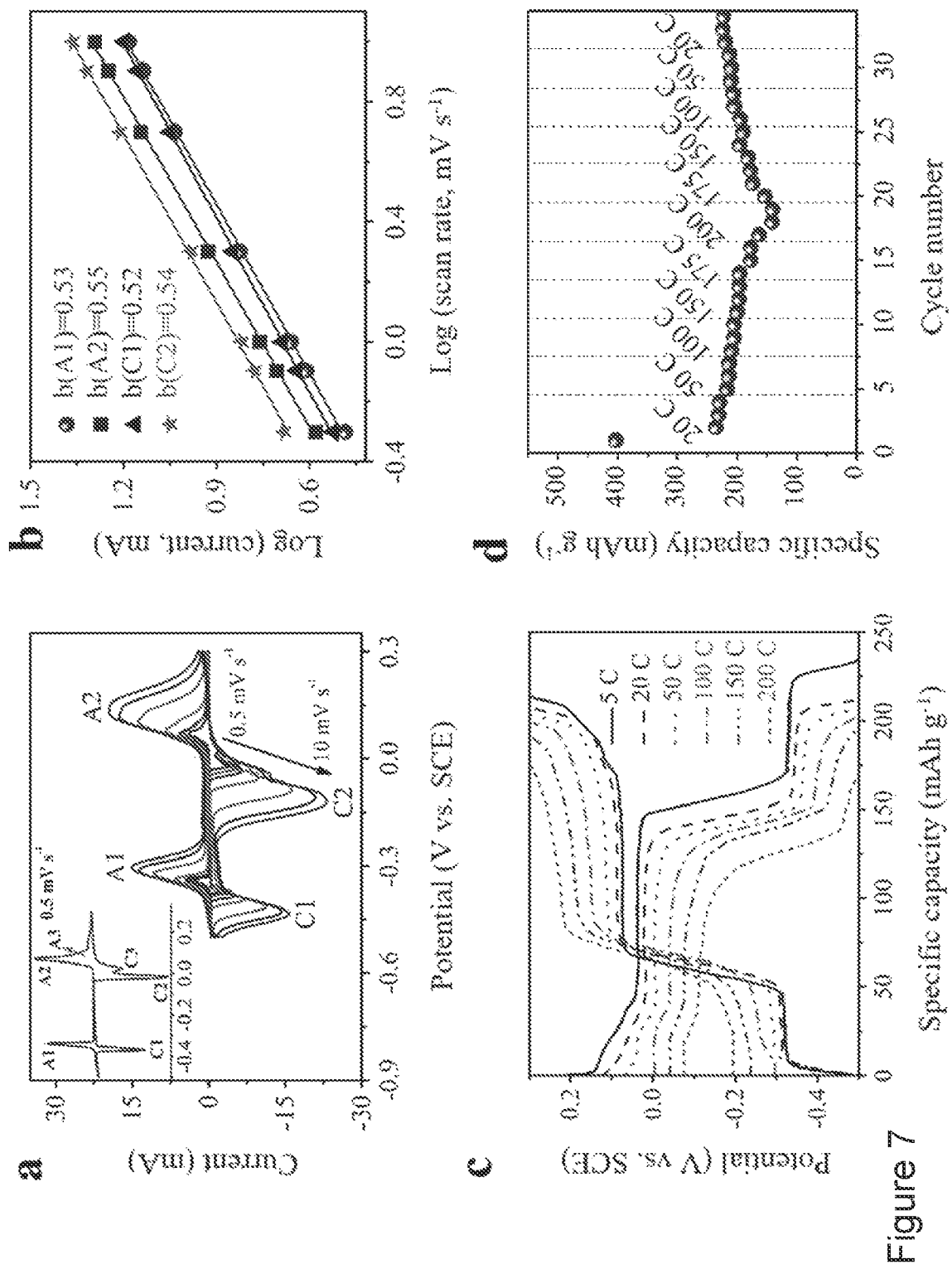
FIG. 7 summarizes results from hydrogen-ion storage performance studies described in Example 2 at an areal loading of ~1 mg $cm^{-2}$. (a) shows CV curves at different scan rates between 0.5 and 10 mV $s^{-1}$, the inset is the CV curve at 0.5 mV $s^{-1}$; (b) shows a graph of Log (I) versus log (V) plots at peak currents; (c) is a graph of charge/discharge curves from 5 to 200 C; and (d) is a graph showing rate performance from 20 to 200 C.

To investigate the hydrogen storage properties of MoO$_3$ nanofibers, the areal loading of active material was initially kept relatively low (~1 mg cm$^{-2}$). The inset of FIG. 7a shows the cyclic voltammograms (CV) curve at the scan rate of 0.5 mV s$^{-1}$ in the potential window of ~0.5~ 0.3 V. It displays three pairs of redox peaks at −0.37/−0.34 V (C1/A1), −0.02/0.07 V (C2/A2), and 0.02/0.10 V (C3/A3), indicating a three-step redox reaction during H insertion/extraction process. A small polarization of approximately 90 mV is exhibited, implying the fast reaction kinetics of the MoO$_3$-nanofibers electrode. CV studies collected at scan rates from 0.5 to 10 mV s$^{-1}$ are depicted in FIG. 7a, which can provide the information on the H$^+$ storage kinetics. The peak current (i) and the scan rate (v) obey the power law Eq. (1).

$$i = av^b \qquad (1)$$

where a and b are alterable values. It is generally believed that a b-value of 0.5 suggests an ion diffusion-controlled electrochemical process, while a value of 1.0 indicates capacitive behavior. In FIG. 7b, the slopes of log (i) versus log (v) plots, namely b-values, for A1/C1 and A2/C2 are 0.53/0.52 and 0.55/0.54, respectively, suggesting H$^+$-diffusion kinetics for the MoO$_3$ electrodes.

Figure 8:
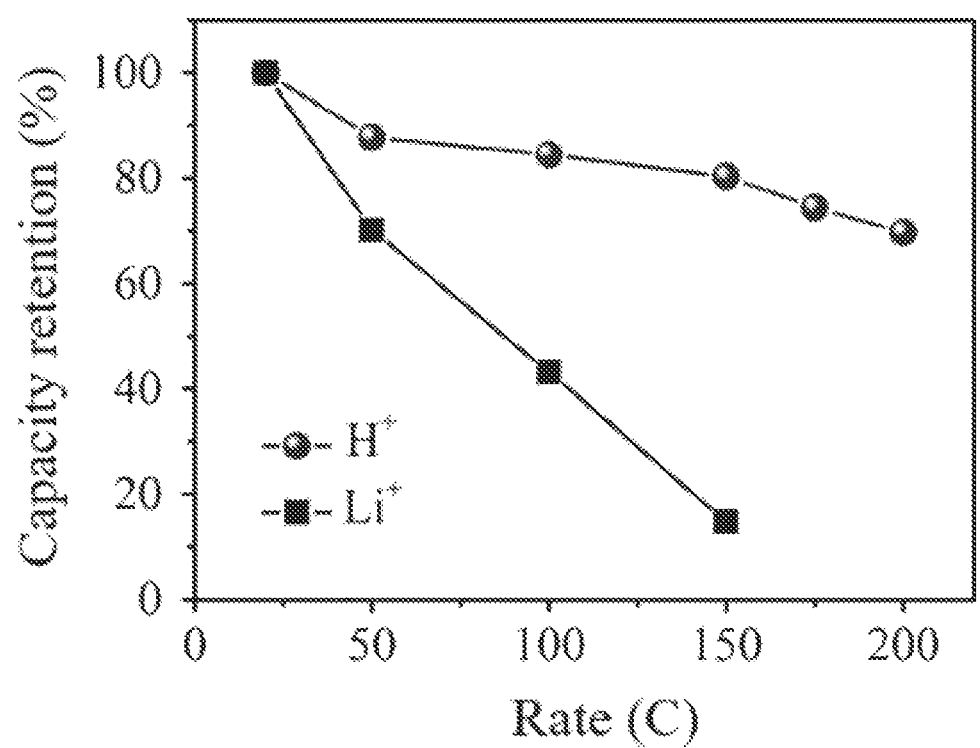
FIG. 8 is a graph showing a rate performance comparison of $MoO_3$ for hydrogen ion and lithium ion storage.

The charge/discharge curves at various rates from 5 C to 200 C (1 C=200 mA g$^{-1}$) are presented in FIG. 7c. Three pairs of charge and discharge plateaus can be easily distinguished even at an ultrahigh rate of 200 C, corresponding well to the CV curves. A high capacity of 235 mAh g$^{-1}$ was achieved at a current density of 5 C, which is higher than a previously reported value (150 mAh g$^{-1}$). This is hypothesized to be because of a larger amount of hydrogen ions available in the electrolyte of this example to migrate in and out of the MoO$_3$ electrode, and thus contribute to improved capacity. Remarkably, the MoO$_3$ electrode maintains a substantial capacity of 174 mAh g$^{-1}$ (74% of that at 5 C) with the current density increasing to 200 C when the discharge process was quickly completed in only 12 s. This performance is much better than that of an aqueous lithium-ion battery (15% capacity maintained at 150 C, FIG. 8), believed to be due to the faster hydrogen-ion diffusion kinetics compared with lithium ions. In addition, with the current density returning from 200 C to 20 C, the average capacity recovers to 96% of that at initial 20 C (231 mA h g$^{-1}$, FIG. 7d), exhibiting excellent rate capability.

Figure 9:
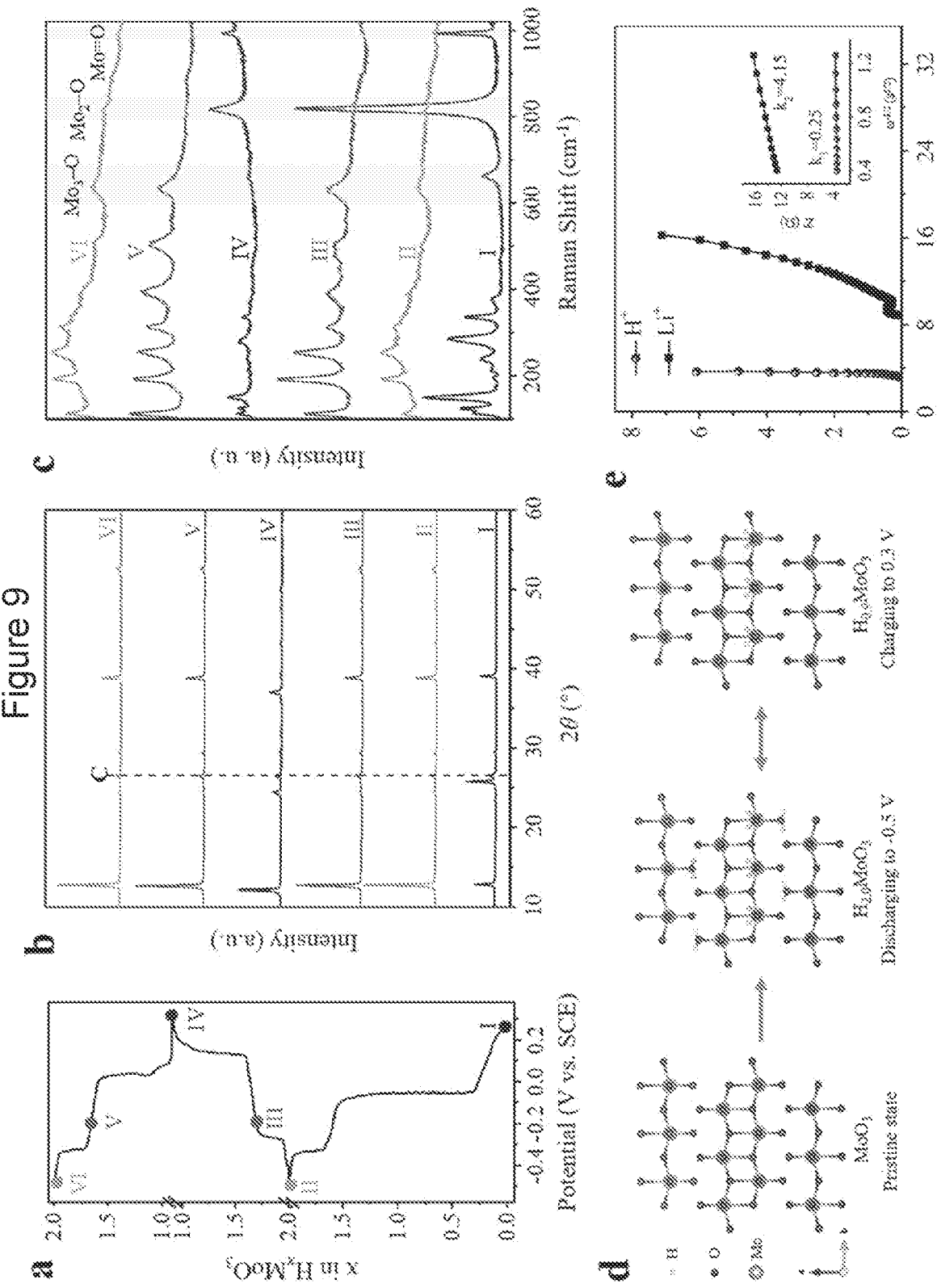
FIG. 9 summarizes results from investigations into the structural changes of the $MoO_3$ nanofibers and kinetics during hydrogen-ion intercalation/deintercalation as described in Example 2. (a) shows an indication of different charge and discharge states; (b) shows ex situ XRD patterns; (c) shows ex situ Raman spectra; (d) shows the proposed crystal structures of pristine $MoO_3$, $MoO_3$ after discharge to −0.5 V and charging to 0.3 V; and (e) shows Nyquist plots of $MoO_3$ for the hydrogen-ion and lithium-ion storage (inset is Z' versus $\omega^{-1/2}$ in the low-frequency range).

The hydrogen contents of the MoO$_3$ electrode during cycling were calculated according to Faraday's law (FIG. 9a). When the cell was first discharged to −0.5 V, a high-content (2.0 mol eq.) of hydrogen ions intercalated into the MoO$_3$ electrode, forming H$_{2.0}$MoO$_3$. During the following electrochemical cycling processes, 1.1 mol eq. hydrogen ions reversibly deintercalated/reintercalated into the electrode, leading to the transformation between H$_{0.9}$MoO$_3$ and H$_{2.0}$MoO$_3$. These H content changes were accompanied by a colour change, where only electrode IV displayed a deep blue colour (low H content, H$_{0.9}$MoO$_3$), whereas the others displayed a dark red colour (high H content). The overall electrochemical reactions during charge and discharge process can be described as follows.

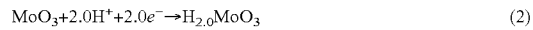

$$MoO_3 + 2.0H^+ + 2.0e^- \rightarrow H_{2.0}MoO_3 \qquad (2)$$

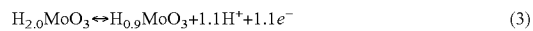

$$H_{2.0}MoO_3 \leftrightarrow H_{0.9}MoO_3 + 1.1H^+ + 1.1e^- \qquad (3)$$

Figure 13:
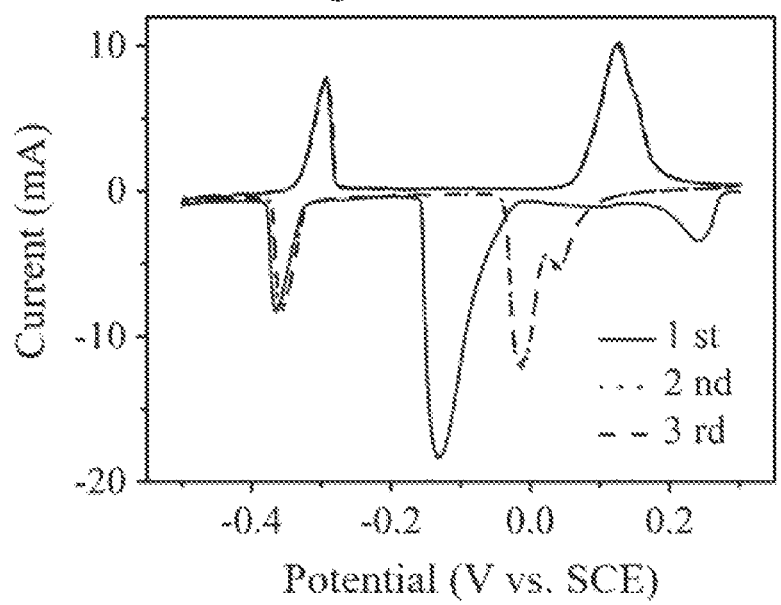
FIG. 13 is a graph showing the CV curves for the first three cycles at a scan rate of 2 mV $s^{-1}$, for the material of Example 2.
Figure 14:
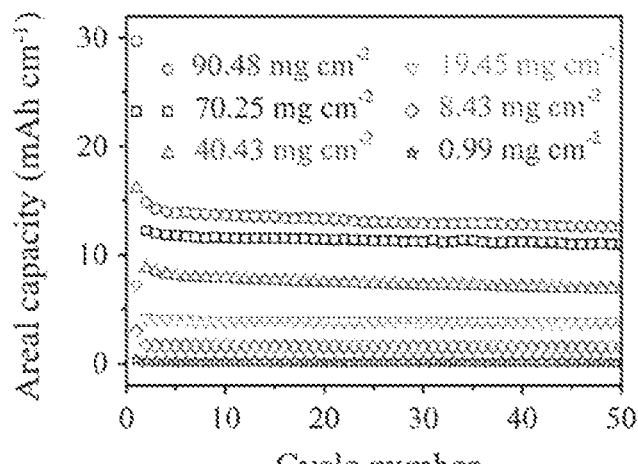
FIG. 14 is a graph showing the areal capacities of different loading electrodes (as described in Example 2) at a current density of 18 mA $cm^{-2}$ over the first 50 cycles.
Figure 15:
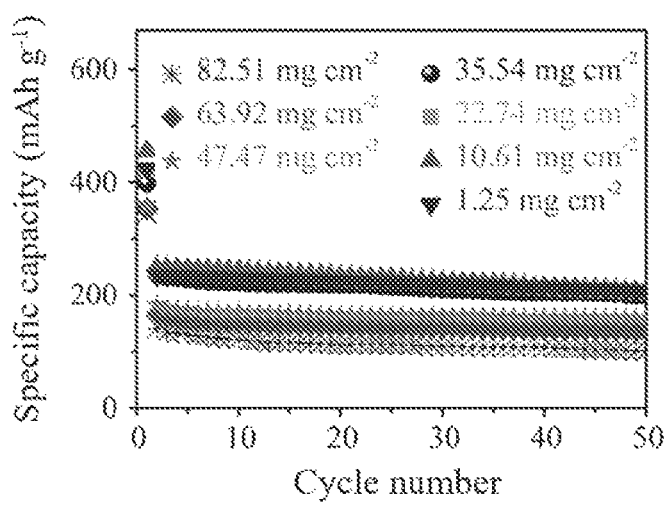
FIG. 15 is a graph showing the specific capacities of different areal-loading electrodes (1.25~82.51 mg $cm^{-2}$; as described in Example 2) at a current density of 2 C over the first 50 cycles. As can be seen, the electrodes with areal loading of 1-35 mg $cm^{-2}$ deliver very similar specific capacities. When the areal loading increases to 82.51 mg $cm^{-2}$, the $MoO_3$ electrode still exhibits high activity and useful discharge capacity.
Figure 16:
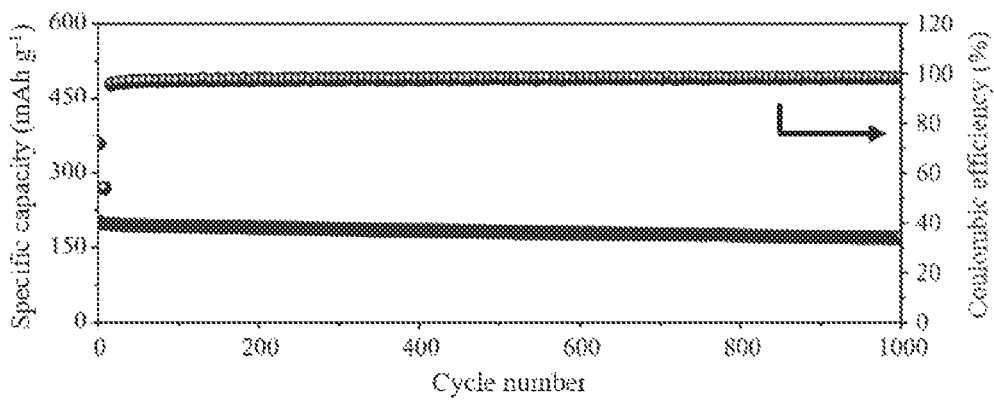
FIG. 16 is a graph showing the cycle performance and coulombic efficiency of the 10 mg $cm^{-2}$ electrode at current density of 15 C (as described in Example 2). The Coulombic efficiency is stabilized at ~100%, suggesting the high Coulombic efficiency of high areal loading electrodes.

Ex situ XRD patterns were collected at different charge/discharge states to probe the structural evolution of the MoO$_3$ electrode (FIG. 9b). For the pristine state, the peak at 26.6° corresponded to carbon black while the other peaks were attributed to orthorhombic MoO$_3$ (pattern I). After the first discharge process, pattern II and pattern III in the first charge curve matched very well with pattern VI and V in second discharge state, respectively, indicating a highly reversible hydrogen-ion insertion/deintercalation. The diffraction peaks of pattern IV (fully charging to 0.3 V) are clearly different from that of pattern I, indicating the first discharge process is irreversible. The irreversible first discharge corresponds to the result of Faraday calculation, 2.0 mol eq. hydrogen inserting into MoO$_3$, which can further explain the larger cathodic peak current observed in the first cycle of CV curves (FIG. 13) and the higher first-cycle discharge capacity (FIG. 7d). Surprisingly, the d-spacing of MoO$_3$ (200) planes increases from 0.693 nm to 0.727 nm during the charging process (hydrogen ion extraction), as indicated by the shift of the peak at 12.77° in pattern II to 12.17° in pattern IV, while decreasing during discharging process (hydrogen ion insertion). This phenomenon is attributed to a strong electrostatic interaction between the MoO$_6$ octahedron layer and intercalated hydrogen ions.

Ex situ Raman spectra (FIG. 9c) were used to further reveal the crystal phase change of MoO$_3$ caused by H$^+$ insertion/extraction. The reversibility of Raman spectra at different charge/discharge states corresponds with ex situ XRD. Vibration modes in the range of 600-1000 cm$^{-1}$ are characteristic of orthorhombic MoO$_3$ (as highlighted in FIG. 9c). At the pristine state (spectrum I), the peaks at 663 cm$^{-1}$ (B$_{2g}$, B$_{3g}$), 818 cm$^{-1}$ (A$_g$, Bi$_g$) and 991 cm$^{-1}$ (A$_g$, Bi$_g$) were assigned to the stretching of the triply connected bridge oxygen (Mo$_3$—O), the doubly connected bridge oxygen (Mo$_2$—O) along the c axis, and the terminal oxygen atoms (Mo=O), respectively. After the first discharge process (spectrum II), the insertion of the large amount of hydrogen ions caused the breakage of Mo$_2$—O and Mo=O bonds with the peaks at 818 cm$^{-1}$ and 991 cm$^{-1}$ disappearing. Conversely, all peaks recover to the pristine state after charging (spectrum IV), and three types of oxygen atoms emerged again. Based on the above results, the postulated structural evolutions of MoO$_3$ during charge and discharge processes is schematically presented in FIG. 9d.

The hydrogen-ion diffusion kinetics of MoO$_3$ electrodes was further evaluated by electrochemical impedance spectrum (EIS). According to the low-frequency region of Nyquist plot, the hydrogen-ion diffusion coefficient can be calculated by the following equation.

$$D=0.5(RT/An^2F^2\sigma_w C)^2 \quad (4)$$

where R is the gas constant, T is the absolute temperature, A is the electrode area, n is the number of transferred electrons per mole during the electrode reaction, F is Faraday's constant, C is the H concentration, and $\sigma_w$ is the Warburg factor which can be obtained from the slope of Z' versus $\omega^{-1/2}$ (inset of FIG. 9e). Thus, the H$^+$ diffusion coefficient of MoO$_3$ electrode was calculated to be 3.27×10$^{-10}$ cm$^2$ s$^{-1}$, which is in good agreement with the result by CV (not shown) and 30 times as high as that of Li$^+$ (1.09×10$^{-11}$ cm$^2$ s$^{-1}$). Furthermore, H$^+$ Warburg factors of all discharge states were much smaller than those of Li$^+$, indicating the ultrafast diffusion kinetics of hydrogen ions during cycling. The Randles-Sevcik equation was used to calculate the ion diffusion coefficients of hydrogen ion in the MoO$_3$-nanofibers electrode by CV test. The apparent ion diffusion coefficient D$_{CV}$ was calculated to be 2.00×10$^{-10}$, 3.41×10$^{-10}$, 2.10×10$^{-10}$ and 4.71×10$^{-10}$ cm$^2$ s$^{-1}$ at the peak of A1, A2, C1 and C2, respectively. Hence, the average ion diffusion coefficient obtained by CV was 3.06×10$^{-10}$ cm$^2$ s$^{-1}$.

Figure 10:
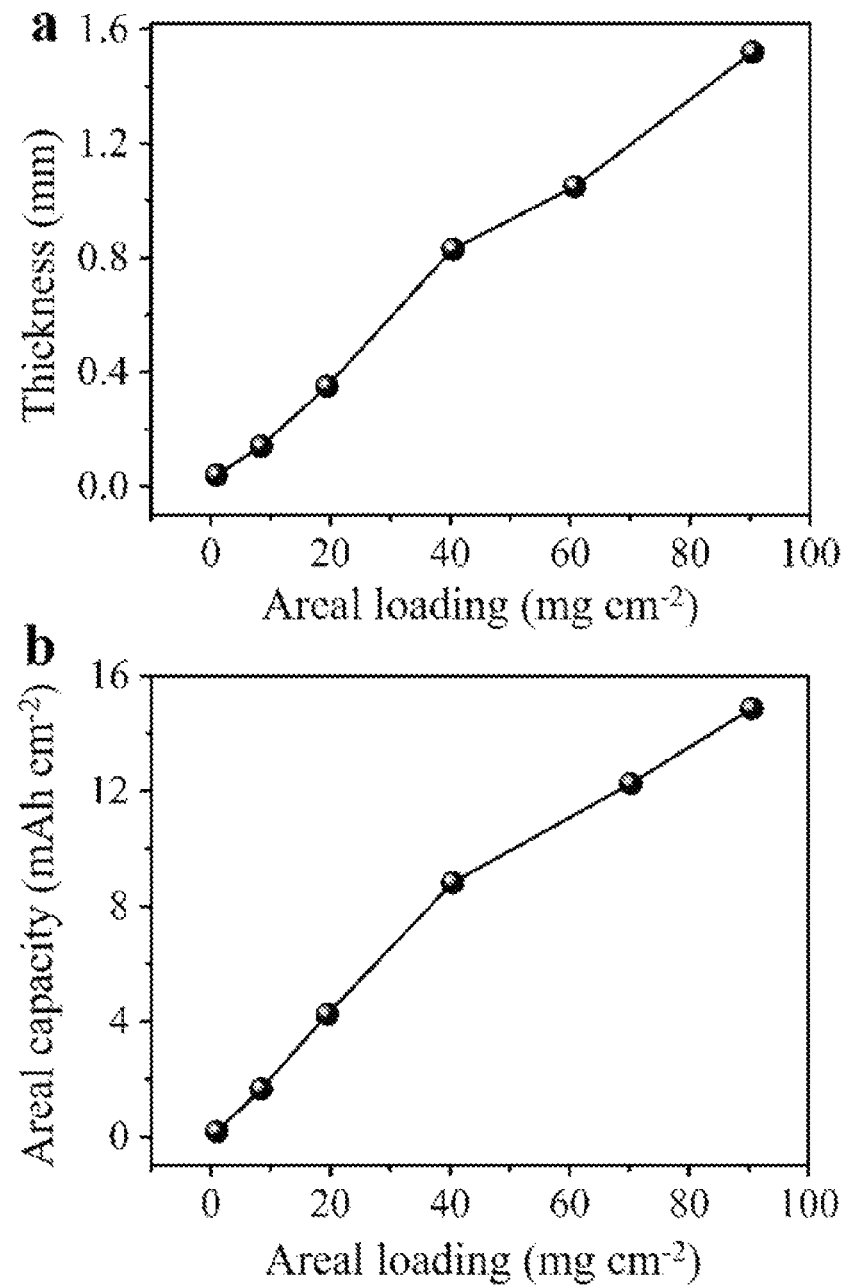
FIG. 10 shows graphs of (a) thickness versus areal loading plot for $MoO_3$ electrodes from Example 2; and (b) areal capacity measured on the 2nd cycle versus the areal loading of electrodes as described in Example 2.
Figure 11:
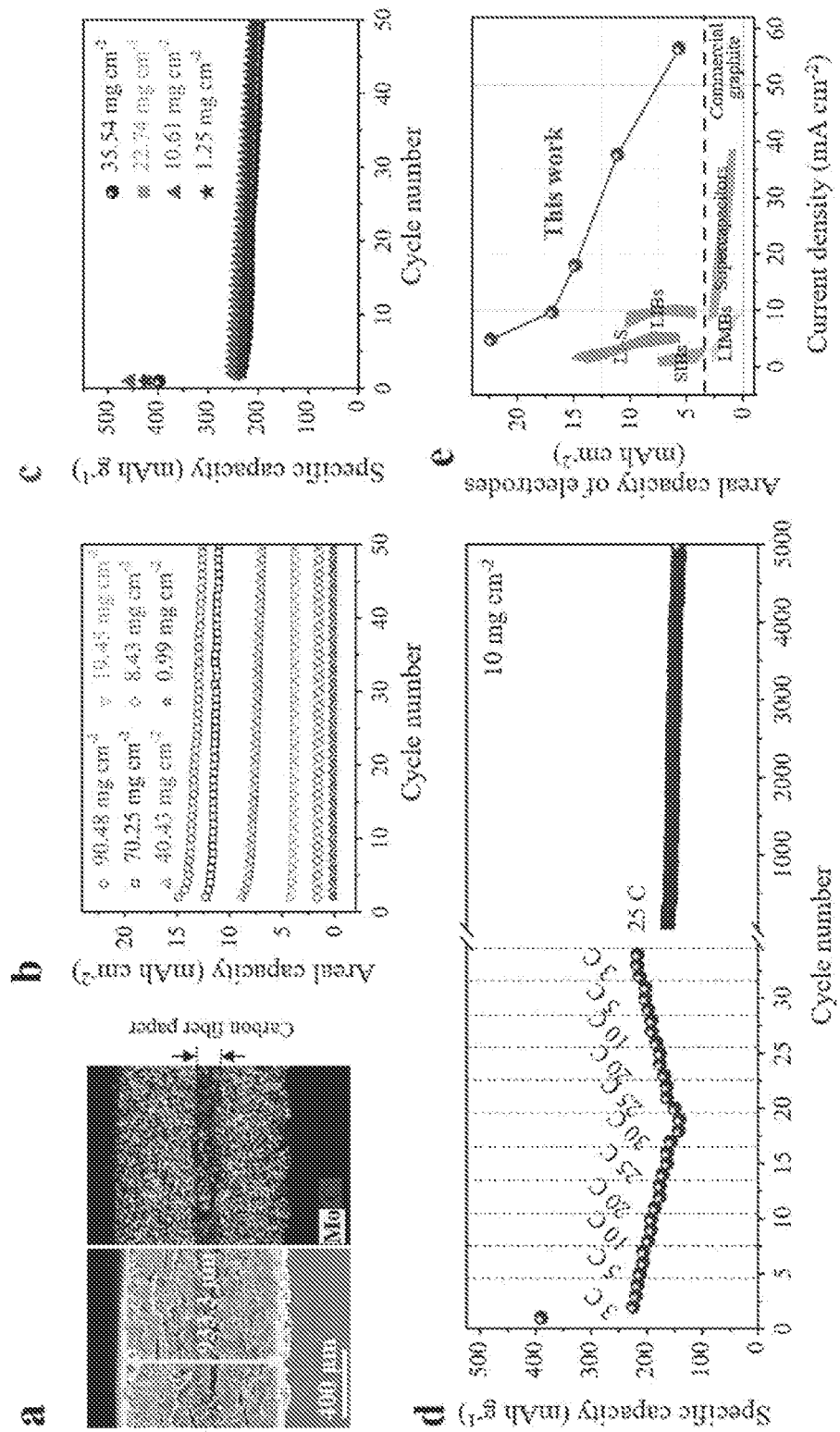
FIG. 11 summarizes results from investigations into hydrogen-ion storage performance at high areal loading, as described in Example 2. (a) is an image showing the cross-sectional mapping images of the $MoO_3$ electrode (49 mg $cm^{-2}$) (yellow signal represents Mo from $MoO_3$, and red signal represents C from the carbon fiber paper); (b) is a graph showing the areal capacities of different loading electrodes at the current density of 18 mA $cm^{-2}$; (c) is a graph showing the specific capacities of different areal-loading electrodes at 2 C (400 mA $g^{-1}$); (d) is a graph showing the rate performance from 3 to 30 C of the high areal-loading electrode (10 mg $cm^{-2}$); (e) is a graph showing the areal capacities of the electrode of this work compared to various electrical energy storage devices: lithium-sulfur batteries (Li—S), lithium-ion batteries (LIBs), sodium-ion batteries (SIBs), lithium-ion microbatteries (LIMBs), and supercapacitors.

On the basis of the appealing electrochemical performance at the low areal loading (1 mg cm$^{-2}$), charge storage properties of thick electrodes were investigated. High areal-loading electrodes (from 8.43 up to 90.48 mg cm$^{-2}$) were prepared by coating both sides of carbon fiber paper. A value of 90.48 mg cm$^{-2}$ was the highest loading achieved by the conventional coating method described above and is also believed to be the highest areal loading reported to date. The electrode thickness excluding the carbon fiber paper was in the range of 0.14-1.52 mm (FIG. 10a). A selection of cross-sectional mapping images of the 49 mg cm$^{-2}$ electrode are shown in FIG. 11a, where MoO$_3$ was uniformly distributed on both sides of carbon fiber paper with a thickness of 933.3 m. The high areal-loading electrodes were galvanostatically charged and discharged at 18 mA cm$^{-2}$, believed to be the highest areal current densities in the battery development community to date (FIG. 11b). Even at such a high current density, the 90.48 mg cm$^{-2}$ electrode displayed a high areal capacity of 14.9 mAh cm$^{-2}$, which is much higher than those of reported lithium-ion batteries and sodium-ion batteries (<10 mAh cm$^{-2}$). To illustrate the linear relationship between areal capacity and active materials loading, the high capacities of first cycle are subtracted. The linear relationship is affirmed by that of thickness versus areal loading (FIG. 10), indicating that hydrogen ions are able to diffuse through the thick electrode despite the relatively long transport distance. Furthermore, different areal-loading electrodes deliver very similar specific capacities at the same gravimetric current density (FIG. 11c).

Figure 12:
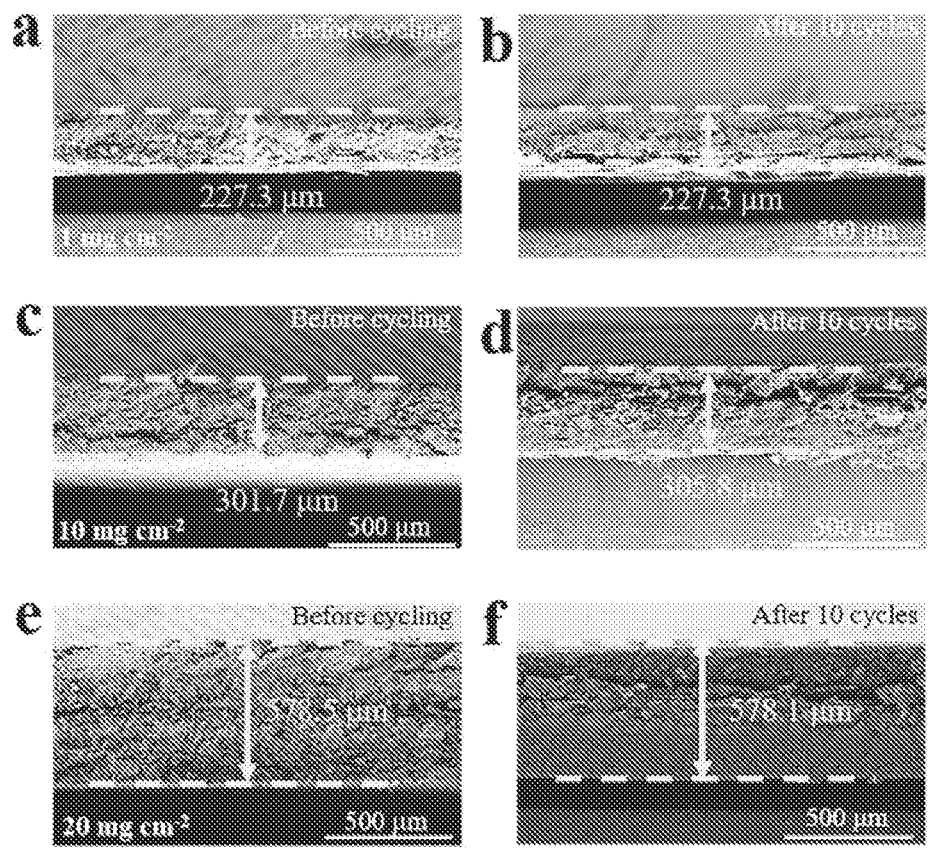
FIG. 12 is a series of SEM images showing the cross-section of $MoO_3$ electrodes of Example 2 before cycling and after 10 cycles of hydrogen ion storage/release. Particularly, (a, b) show 1 mg $cm^{-2}$; (c, d) show 10 mg $cm^{-2}$; and (e, f) show 20 mg $cm^{-2}$.

Apart from the excellent capacity, the thick electrodes also exhibited superior rate capability and long-cycle stability (FIG. 11d), which is rare for high loading electrodes. A high capacity of 147 mAh g$^{-1}$ was achieved at a high current density of 6 A g$^{-1}$ (30 C), maintaining 67% of that at 0.6 A g$^{-1}$ (3 C). The stability after long-range current fluctuation was further assessed, with 87% capacity retained even after 5000 cycles at 25 C, corresponding to a small capacity fading of 0.003% per cycle. It is worth noting that the thickness of the high loading electrodes has negligible change before and after the cycles (FIG. 12) demonstrating the structural stability of MoO$_3$ upon the storage of small-size hydrogen ions, and further explaining the observed outstanding cycling stability.

As shown in FIG. 11e, the MoO$_3$ anode for hydrogen ion storage/intercalation possessed a high areal capacity of up to 22.4 mAh cm$^{-2}$, which is believed to be superior to most, if not all, electrical energy storage devices reported to date including lithium-ion batteries (LIBs), sodium-ion batteries (SIBs), lithium-sulfur batteries (Li—S), lithium-ion micro-batteries (LIMBs), and supercapacitors. Additionally, the example reported herein uses a conventional coating method for electrode preparation and is not reliant on any special modifications. Therefore, the present methodology may be seen as a more attractive option for industrial fabrication and large-scale applications.

Conclusions

Example 2 demonstrates that hydrogen ions can diffuse thoroughly into a thick electrode to achieve an ultrahigh areal capacity. At a relatively low areal loading, a high specific capacity of 235 mAh g$^{-1}$ at 5 C and an impressive rate capability of up to 200 C may be achieved with the MoO$_3$-nanofiber anode. This high specific capacity is ascribed to the reversible redox reactions between H$_{2.0}$MoO$_3$ and H$_{1.1}$MoO$_3$ during cycling. Remarkably, the high areal loading electrodes also exhibit outstanding rate performance, long life span (e.g. ≥5000 times) and ultrahigh areal capacity of 22.4 mAh cm$^{-2}$. Kinetics studies reveal that the H$^+$ diffusion coefficient (3.27×10$^{-10}$ cm$^2$ s$^{-1}$) is calculated to be 30 times higher than that of Li$^+$ (1.09×10$^{-11}$ cm$^2$ s$^{-1}$). The high loading electrodes, achieved by a conventional coating method, enables simple battery assembly processes and may reduce costs, which are beneficial for industrial fabrication and large-scale applications.

Example 3

An Mn—H battery/cell was prepared. The cell in this example utilized MoO$_3$ (prepared in the same manner as described in Example 2) as the material capable of absorbing protons and/or hydronium ions, MnO$_2$ as the cathode substance and Mn$^{2+}$ as the reduced cathode substance (i.e. the redox pair MnO$_2$/Mn$^{2+}$). The redox pair was introduced into the system in the electrolyte (which was aqueous and contained Mn$^{2+}$)

Figure 17:
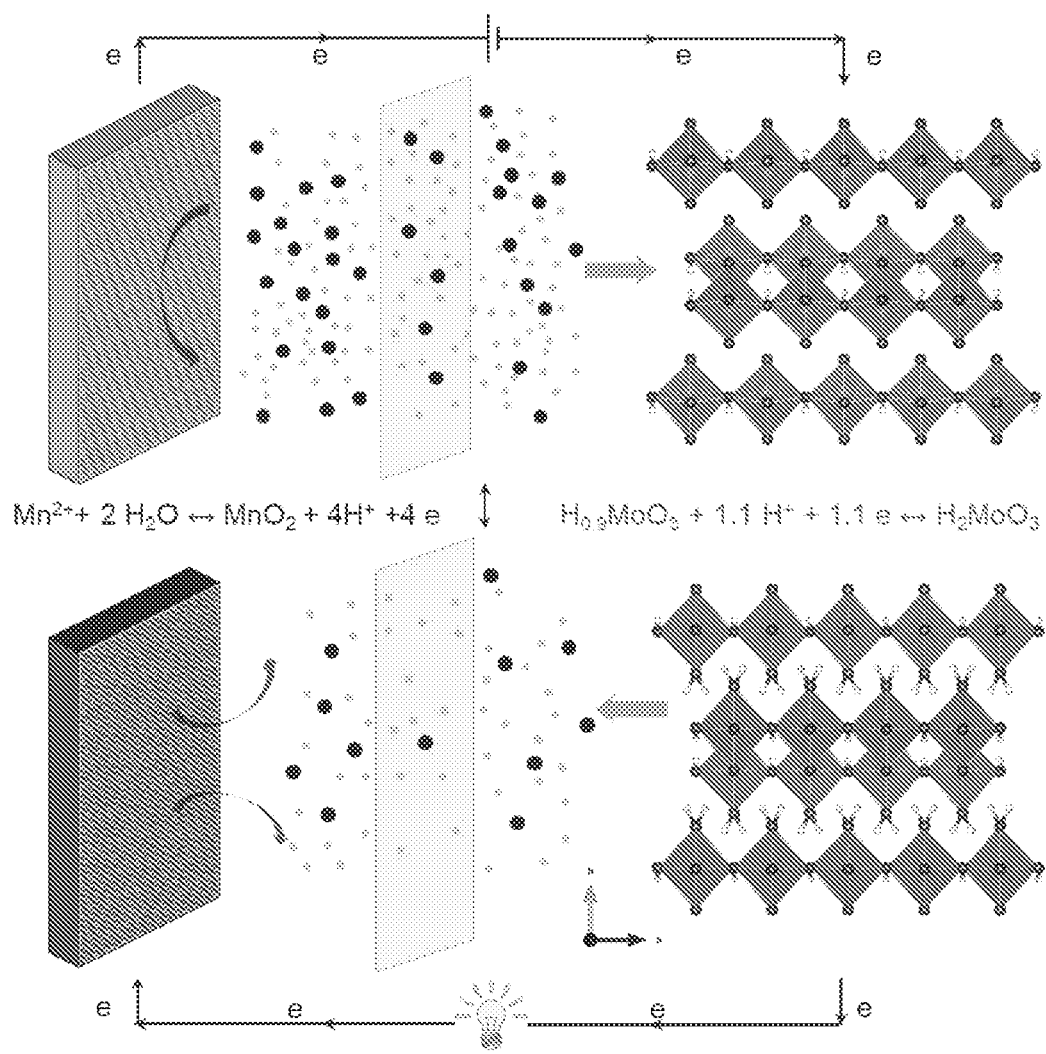
FIG. 17 is a schematic diagram of the battery cell described in Example 3. The cathodic process is on the left-hand side and shows the conversion between the cathode substance $MnO_2$ and the reduced cathode substance $Mn^{2+}$ and the movement to/from the electrolyte. The anodic process is on the right-hand side and shows the anticipated chemical structures of the $MoO_3$ complexes involved.
Figure 18:
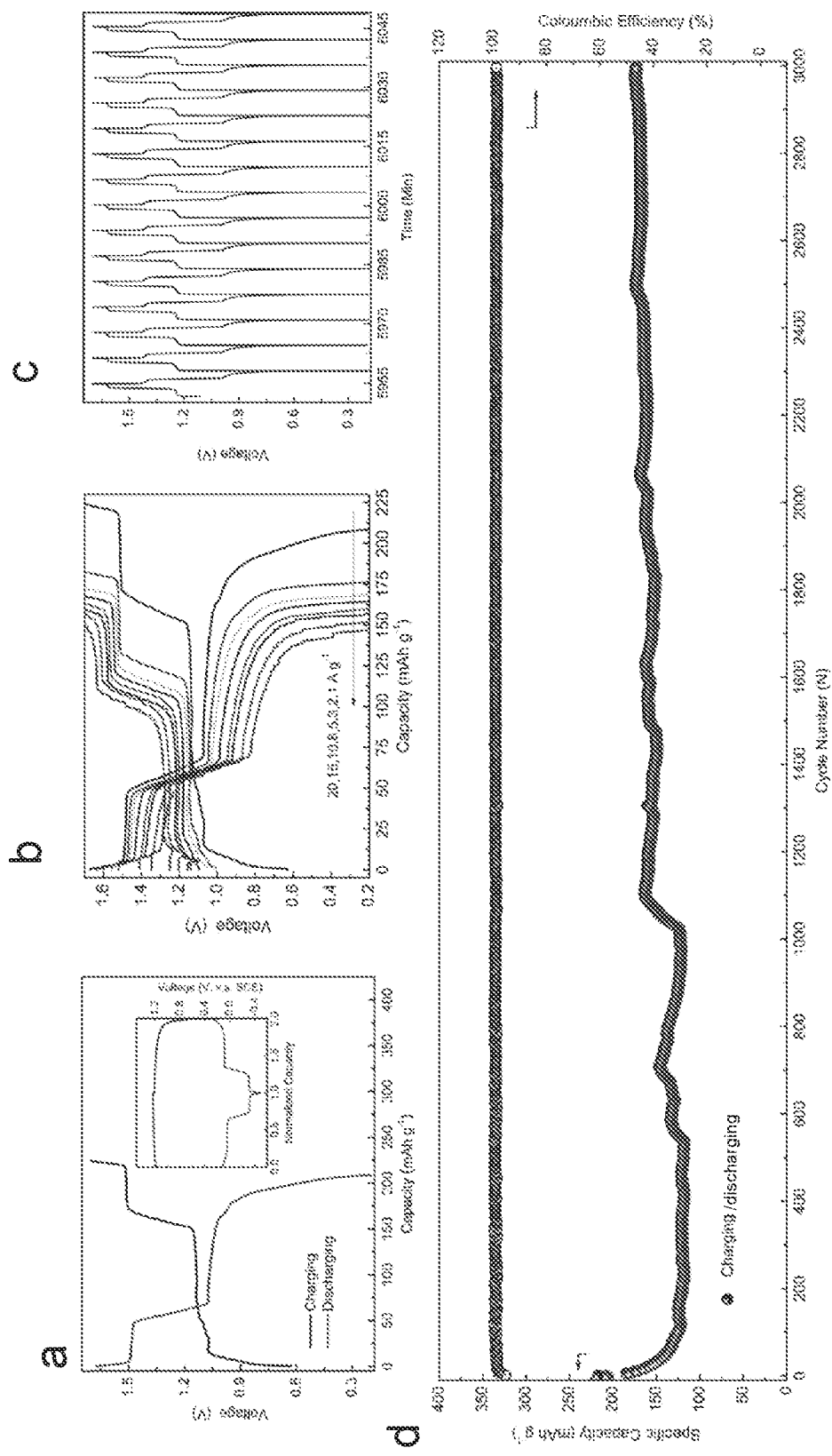
FIG. 18 shows the basic electrochemical properties of the battery cell described in Example 3. All data were tested in standard glassware cells (sealable beaker cell and H-cell). (a) shows a graph of voltage (V, y-axis) vs capacity per gram (mAh $g^{-1}$, x-axis). Inset shows the normalized capacity for a complete charge-discharge cycle; (b) shows a graph of voltage (V, y-axis) vs capacity per gram (mAh $g^{-1}$, x-axis) at different charge/discharge rates (20, 15, 10, 8, 5, 3, 2, 1 A $g^{-1}$ (left to right)); (c) shows a graph of voltage (V, y-axis) vs time (min, x-axis) over various charge-discharge cycles; and (d) is a graph showing the cycle performance and coulombic efficiency.

A schematic diagram of the cell is depicted in FIG. 17 which shows the cathodic process (left-hand side), the anodic process (right-hand side) and the anticipated chemical structures of the Mo complexes and electrolyte content.

Electrochemical properties of the cell were assessed in standard lab-level glassware (sealable beaker-type cell and H-type cell). Typically, single piece of 4*4 cm$^2$ carbon felt (~6 mm thick) was used as cathode current collector, a piece of 2*1 cm$^2$ Ti substrates (plate or mesh) were used as anode current collector with anode (average~5 mg) loaded on 1*1 cm$^2$ working area, and 0.8 M MnSO$_4$ in 4.4 M H$_2$SO$_4$ was set as the electrolyte. Once the battery cell was fabricated, a 2-electrode test was performed via a Landt battery tester with different testing conditions.

Figure 19:
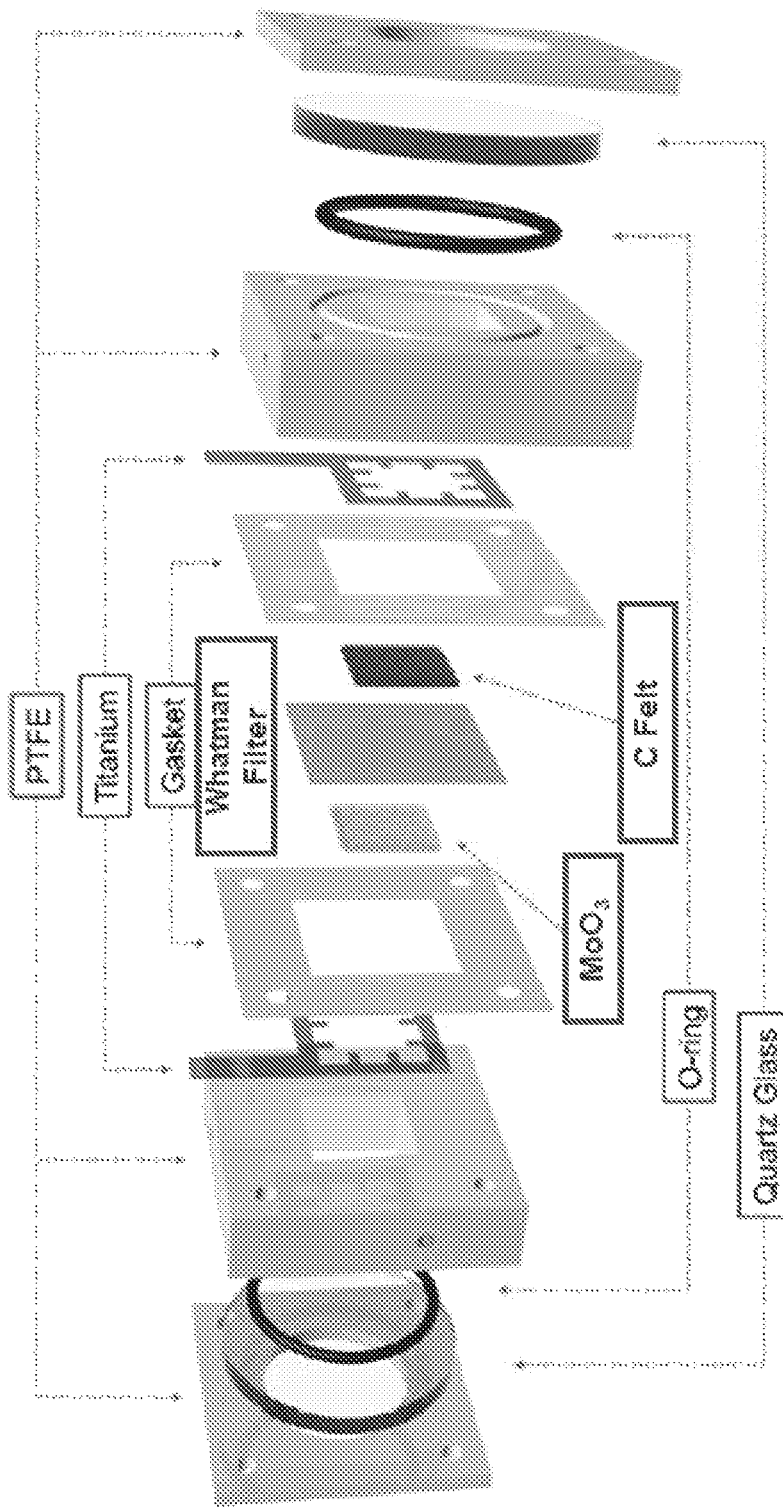
FIG. 19 is an exploded view of a customized battery device as described in Example 3.
Figure 20A:
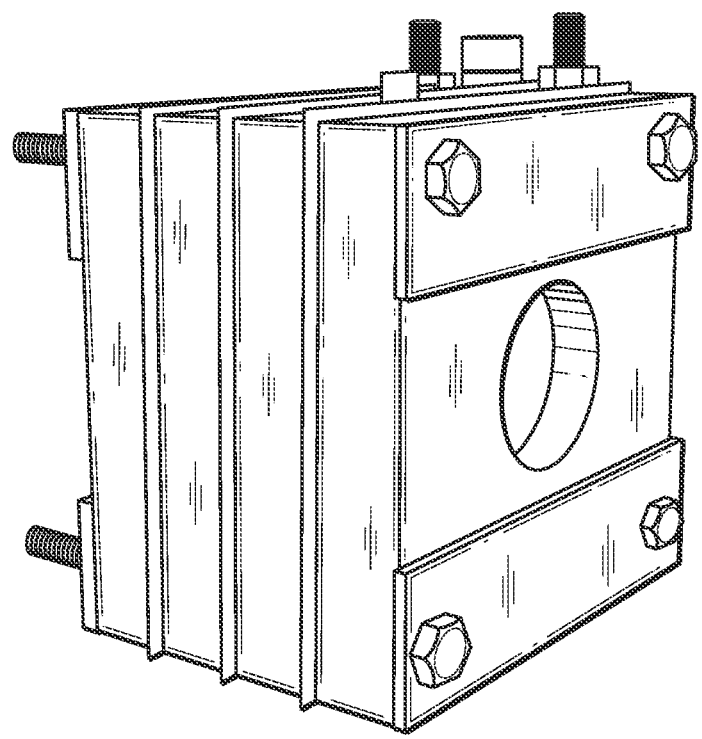
FIG. 20a is a photograph of the customized battery device shown in FIG. 19 and as described in Example 3.

A customized battery device was used and an exploded view of the cell assembly is shown in FIG. 19 and a photograph of the assembled cell is shown in FIG. 20a.

Figure 20B:
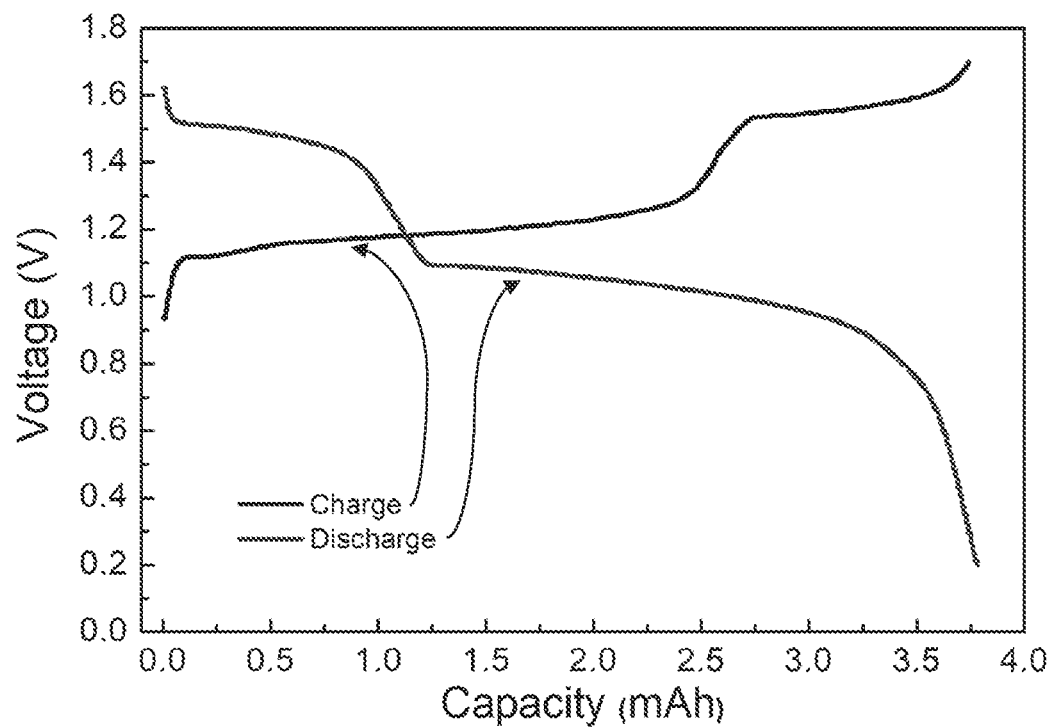
FIG. 20b shows a graph of voltage (V, y-axis) vs capacity per gram (mAh $g^{-1}$, x-axis) of the battery cell described in Example 3 and shown in FIG. 20a during charging and discharging at 40 mA (corresponding to 2 A $g^{-1}$).
Figure 20C:
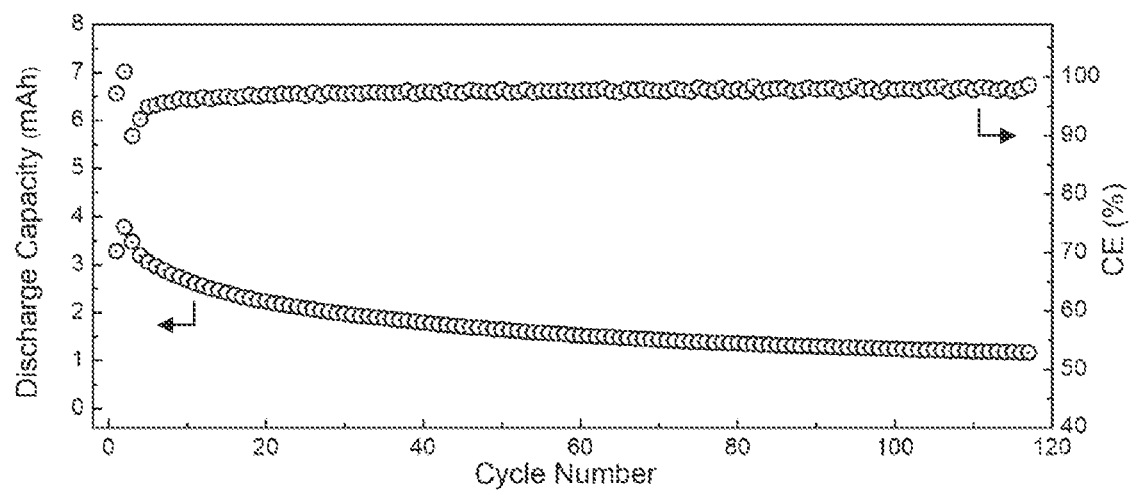
FIG. 20c is a graph showing the cycle performance and coulombic efficiency of the battery cell described in Example 3 and shown in FIG. 20a. The Coulombic efficiency stabilized at about 97% efficiency.
Figure 20D:
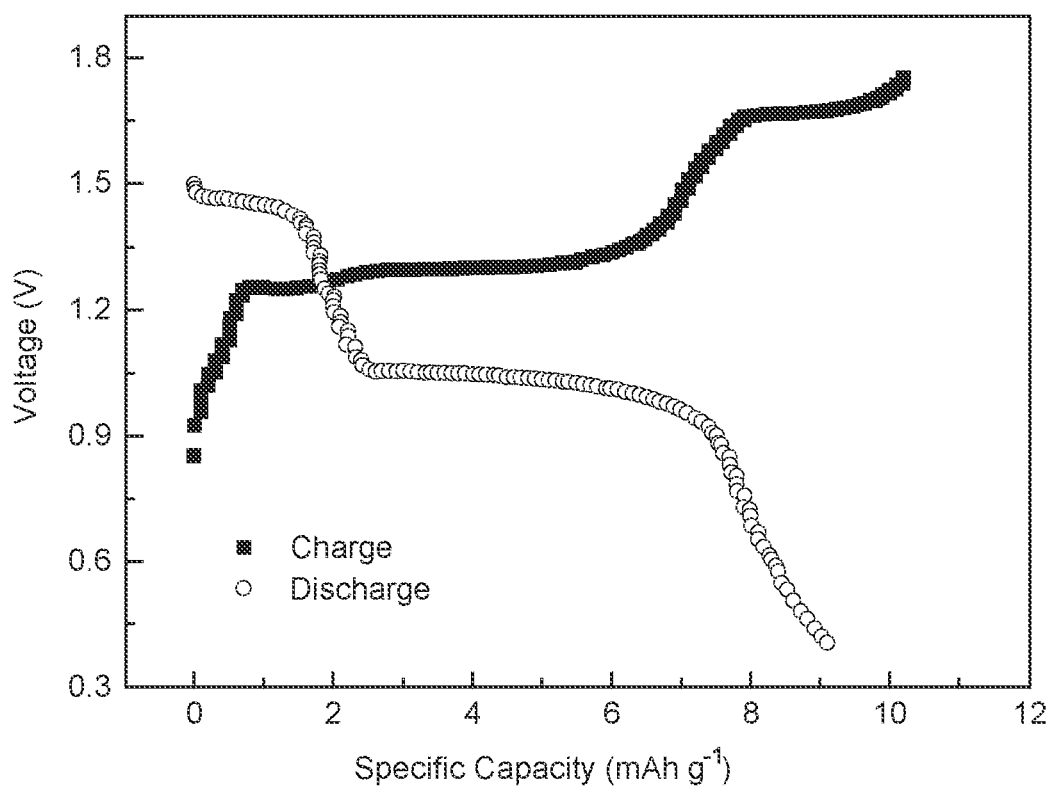
FIG. 20d is a graph showing the charge discharge curve of the performance of a higher mass loading of the battery cell described in FIG. 20a (performed at 125 mA current).

The battery performances were also tested via the customized battery device. Experimentally, it was used, C Felt (4*4 cm$^2$, 2 layers), 18.97 mg MoO$_3$ loaded on 4*4 cm$^2$ Ti mesh, 40 mL hybrid electrolyte describe above. The results of these tests are summarized in FIGS. 20b-c. And with similar configuration, when increase the active materials loading mass (41.81 mg), higher capacity is available, as shown in FIG. 20d.

In summary, the results indicate that the cell had high energy efficiency, ultrahigh power density and good cycling stability.

It is to be understood that, if any prior art publication is referred to herein, such reference does not constitute an admission that the publication forms a part of the common general knowledge in the art, in Australia or any other country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A method of making a battery, the method comprising contacting an electrolyte with an anode and a cathode, wherein:

the electrolyte is capable of conducting protons and/or hydronium ions and comprises (a) protons and/or hydronium ions and (b) a reduced cathode substance, the reduced cathode substance having a conjugate redox pair which is a cathode substance being an oxide of one or more metals or an oxide of a halide; and the anode comprises a material capable of absorbing protons and/or hydronium ions:, and wherein the cathode substance is MnO$_2$ and the reduced cathode substance is Mn$^{2+}$; or the cathode substance is MnO$_4^-$ and the reduced cathode substance is MnO$_2$; or the cathode substance is PbO$_2$ and the reduced cathode substance is Pb$^{2+}$; or the cathode substance is Bi$_2$O$_4$ and the reduced cathode substance is BiO$^+$; or the cathode substance is Cr$_2$O$_7^{2-}$ and the reduced cathode substance is Cr$^{3+}$; or the cathode substance is VO$_2^+$ and the reduced cathode substance is VO$^{2+}$; or the cathode substance is ClO$_4^-$ and the reduced cathode substance is ClO$_3^-$; or the cathode substance is BrO$_3^-$ and the reduced cathode substance is Br$_2$; or the cathode substance is IO$_3^-$ and the reduced cathode substance is I$_2$;

wherein the anode comprises an electrically conductive substrate in contact with the material capable of absorbing protons and/or hydronium ions, wherein the material is brought into contact with the substrate by airbrushing a fluid containing the material onto the substrate; and wherein the fluid containing the material capable of absorbing protons and/or hydronium ions comprises the material, a binder and a solvent.

2. The method according to claim 1, wherein the method further comprises a step of depositing the cathode substance on the cathode.

3. The method according to claim 1, wherein the method comprises associating protons and/or hydronium ions with the material capable of absorbing protons and/or hydronium ions.

4. The method according to claim 1, wherein the binder is selected from the group consisting of nafion, polyvinylidene difluoride (PVDF), polytetrafluoroethylene (PVDF), carboxymethyl Cellulose (CMC), sulfonated poly(ether ether ketone) (SPEEK) and combinations thereof.

5. The method according to claim 1, wherein the solvent is 2-propanol.

6. The method according to claim 1, wherein the fluid containing the material further comprises an additive selected from acetylene black, XC-72R and a combination thereof.

7. The method according to claim 1, wherein the fluid containing the material is in the form of a slurry.

* * * * *